(12) United States Patent
Hatanaka

(10) Patent No.: US 9,221,354 B2
(45) Date of Patent: Dec. 29, 2015

(54) PROPULSION CONTROL APPARATUS OF ELECTRIC MOTOR VEHICLE AND CONTROL METHOD FOR PROPULSION CONTROL APPARATUS

(75) Inventor: Keita Hatanaka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/415,026

(22) PCT Filed: Jul. 19, 2012

(86) PCT No.: PCT/JP2012/068392
§ 371 (c)(1),
(2), (4) Date: Jan. 15, 2015

(87) PCT Pub. No.: WO2014/013597
PCT Pub. Date: Jan. 23, 2014

(65) Prior Publication Data
US 2015/0202978 A1 Jul. 23, 2015

(51) Int. Cl.
*G05D 1/00* (2006.01)
*B60L 11/18* (2006.01)
(Continued)

(52) U.S. Cl.
CPC ............. *B60L 11/1851* (2013.01); *B60L 1/00* (2013.01); *B60L 7/14* (2013.01); *B60L 11/002* (2013.01);
(Continued)

(58) Field of Classification Search
USPC ......................................................... 701/19
See application file for complete search history.

(56) References Cited

U.S. PATENT DOCUMENTS

| 6,559,621 B2* | 5/2003 | Corless | H01M 6/5033 |
| | | | 307/9.1 |
| 8,010,247 B2* | 8/2011 | Heap | B60K 6/365 |
| | | | 180/65.265 |

(Continued)

FOREIGN PATENT DOCUMENTS

| JP | 2003-134604 A | 5/2003 |
| JP | 2008-141877 A | 6/2008 |

(Continued)

OTHER PUBLICATIONS

International Search Report (PCT/ISA/210) mailed on Oct. 23, 2012, by the Japanese Patent Office as the International Searching Authority for International Application No. PCT/JP2012/068392.

(Continued)

*Primary Examiner* — Hussein A. Elchanti
(74) *Attorney, Agent, or Firm* — Buchanan Ingersoll & Rooney PC

(57) ABSTRACT

A propulsion control apparatus of an electric motor vehicle includes a first power converter that operates as a DC/AC converter, an AC/DC converter, or a DC/DC converter, a second power converter that operates as a DC/AC converter, an AC/DC converter, or a DC/DC converter, a first power storage device and a second power storage device functioning as a direct-current power supply source that is charged using direct-current power supplied from a direct-current common section or a first input output end side or discharges direct-current power to the direct-current common section or the first input and output end side, and a control device that controls operations of the first power converter, the second power converter, the first power storage device, and the second power storage device.

18 Claims, 23 Drawing Sheets

(51) Int. Cl.
*B60L 1/00* (2006.01)
*B60L 7/14* (2006.01)
*B60L 11/00* (2006.01)
*B60L 11/08* (2006.01)
*F02N 11/08* (2006.01)
*H02P 3/14* (2006.01)
*H02P 6/04* (2006.01)

(52) U.S. Cl.
CPC ............ *B60L 11/08* (2013.01); *B60L 11/1801* (2013.01); *B60L 11/1803* (2013.01); *F02N 11/08* (2013.01); *H02P 3/14* (2013.01); *H02P 6/04* (2013.01); *B60L 2200/26* (2013.01); *Y02T 10/725* (2013.01); *Y02T 10/7216* (2013.01); *Y02T 10/7241* (2013.01)

(56) References Cited

U.S. PATENT DOCUMENTS

| | | | | | |
|---|---|---|---|---|---|
| 8,321,082 | B2* | 11/2012 | Ando | ............ | B60K 6/365 |
| | | | | | 208/1 |
| 2002/0171397 | A1* | 11/2002 | Adrian | ............ | H01M 6/5033 |
| | | | | | 320/119 |
| 2009/0118883 | A1* | 5/2009 | Heap | ............ | B60K 6/445 |
| | | | | | 701/22 |
| 2010/0152938 | A1* | 6/2010 | Aoki | ............ | B60W 20/1082 |
| | | | | | 701/22 |
| 2010/0198438 | A1* | 8/2010 | Iraha | ............ | B60W 40/00 |
| | | | | | 701/22 |
| 2011/0078999 | A1* | 4/2011 | Gonze | ............ | F01N 3/2026 |
| | | | | | 60/286 |
| 2012/0007554 | A1 | 1/2012 | Kanamori et al. | | |

FOREIGN PATENT DOCUMENTS

| | | |
|---|---|---|
| JP | 2010-088145 A | 4/2010 |
| JP | 2012-019636 A | 1/2012 |
| JP | 2012-121570 A | 6/2012 |

OTHER PUBLICATIONS

Written Opinion (PCT/ISA/237) mailed on Oct. 23, 2012, by the Japanese Patent Office as the International Searching Authority for International Application No. PCT/JP2012/068392.

* cited by examiner

FIG.22

| | | 2 | 11 | 21 | 25 | 26 | 30 | 40 | 33 | 31 | 24 | 51 | 55 | 58 | 80 | 70 | 63 | 61 | 64 | 10 | 5 | 6 |
|---|---|---|---|---|---|---|---|---|---|---|---|---|---|---|---|---|---|---|---|---|---|---|
| | SIGN / COMPONENT | PANTO-GRAPH | THIRD HB HB1 | FIRST POWER CON-VERTER | FIRST LB LB11 | SEC-OND LB LB12 | FIRST CON-TAC-TOR SW11 | SEC-OND CON-TAC-TOR SW12 | THIRD CON-TAC-TOR SW13 | FOURTH CON-TAC-TOR SW14 | FIRST HB HB21 | SECOND POWER CON-VERTER 2 | THIRD LB LB21 | FOURTH LB LB22 | FIFTH CON-TAC-TOR | SIXTH CON-TAC-TOR SW22 | SEVENTH CON-TAC-TOR SW23 | EIGHTH CON-TAC-TOR SW24 | SEC-OND HB HB22 | NINTH CON-TAC-TOR SW1 | ENGINE | GENE-RATOR |
| FIG | MODE | OPERATION FORM | | | | | | | | | | | | | | | | | | | | | |
| 2 | a-1 | START | BAT1→INV1→ENG START | OFF | × | × | ○ | ○ | ○ | × | ○ | × | × | × | ○ | ○ | × | × | × | × | × | × | ○ | ○ |
| 3 | a-2 | START | BAT2→INV2→ENG START | OFF | × | × | × | × | × | × | × | × | × | ○ | ○ | × | × | × | ○ | ○ | × | ○ | ○ |
| 4 | a-3 | POWER RUNNING+ POWER GENERATION | GENERATOR→CNV2→INV1→ MOTOR1 DRIVING (BAT2 NOT IN USE) | OFF | × | INV | ○ | ○ | ○ | × | × | × | CNV | ○ | ○ | × | × | × | ○ | × | × | ○ | ○ |
| 5 | a-4 | POWER RUNNING+ DISCHARGING | GENERATOR→CNV2→INV1/ MOTOR1 DRIVING (BAT2 IN USE) | OFF | × | INV | ○ | ○ | ○ | × | × | × | CNV | ○ | ○ | × | × | × | ○ | ○ | × | ○ | ○ |
| 6 | a-5 | POWER RUNNING+ POWER GENERATION | GENERATOR→CNV1→INV2→ MOTOR2 DRIVING (BAT1 NOT IN USE) | OFF | × | CNV | ○ | ○ | × | × | ○ | × | INV | ○ | ○ | ○ | × | × | × | × | × | ○ | ○ |
| 7 | a-6 | POWER RUNNING+ DISCHARGING | GENERATOR→CNV1→INV2→ MOTOR2 DRIVING (BAT1 IN USE) | OFF | × | CNV | ○ | ○ | × | × | ○ | ○ | INV | ○ | ○ | ○ | × | × | × | × | × | ○ | ○ |
| 8 | a-7 | | BAT1→DC/DC1→INV2→ MOTOR2 DRIVING | OFF | × | DC/DC | ○ | ○ | ○ | × | × | ○ | INV | ○ | ○ | ○ | ○ | × | × | × | × | × | × |
| 9 | a-8 | | BAT2→DC/DC2→INV1→ MOTOR1 DRIVING | OFF | × | INV | ○ | ○ | ○ | × | × | × | DC/DC | ○ | ○ | × | × | × | × | ○ | × | × | × |
| 10 | a-9 | POWER RUNNING+ DISCHARGING | BAT1→INV1→MOTOR1 DRIVING | OFF | × | INV | ○ | ○ | ○ | × | × | ○ | × | ○ | × | × | × | × | × | × | × | × | × |
| 11 | a-10 | POWER RUNNING+ DISCHARGING | BAT2→INV2→MOTOR2 DRIVING | OFF | × | × | ○ | ○ | × | × | × | × | INV | ○ | ○ | ○ | × | × | × | ○ | × | × | × |
| 12 | a-11 | REGENERA-TION | MOTOR1→INV1→ GENERATOR (BAT1 NOT IN USE) | OFF | × | CNV | ○ | ○ | × | × | ○ | × | INV | ○ | ○ | ○ | × | × | × | × | × | ○ | ○ |
| 13 | a-12 | REGENERA-TION+ CHARGING | MOTOR1→CNV1→INV2→ GENERATOR (BAT1 IN USE) | OFF | × | CNV | ○ | ○ | × | × | ○ | ○ | INV | ○ | ○ | ○ | × | × | × | × | × | ○ | ○ |
| 14 | a-13 | REGENERA-TION | MOTOR2→CNV2→INV1→ GENERATOR (BAT2 NOT IN USE) | OFF | × | INV | ○ | ○ | ○ | × | × | × | CNV | ○ | ○ | × | × | × | ○ | × | × | ○ | ○ |
| 15 | a-14 | REGENERA-TION+ CHARGING | MOTOR2→CNV2→INV1→ GENERATOR (BAT2 IN USE) | OFF | × | INV | ○ | ○ | ○ | × | × | × | CNV | ○ | ○ | × | × | × | ○ | ○ | × | ○ | ○ |
| 16 | a-15 | REGENERA-TION+ CHARGING | MOTOR1→CNV1→DC/DC2→ BAT2 | OFF | × | CNV | ○ | ○ | × | × | ○ | × | DC/DC | ○ | ○ | ○ | × | × | × | ○ | × | × | × |
| 17 | a-16 | REGENERA-TION+ CHARGING | MOTOR2→CNV2→DC/DC1→ BAT1 | OFF | × | DC/DC | ○ | ○ | ○ | × | × | ○ | CNV | ○ | ○ | × | × | × | × | × | × | × | × |
| 18 | a-17 | REGENERA-TION+ CHARGING | MOTOR1→CNV1→BAT1 | OFF | × | × | ○ | ○ | × | × | ○ | ○ | × | ○ | ○ | × | × | × | × | × | × | × | × |
| 19 | a-18 | REGENERA-TION+ CHARGING | MOTOR2→CNV2→BAT2 | OFF | × | × | ○ | × | × | × | × | × | × | ○ | ○ | × | × | × | × | ○ | × | × | × |
| 20 | a-19 | GENERATION+ CHARGING | GENERATOR→CNV1→BAT1 | OFF | × | CNV | ○ | ○ | × | × | ○ | ○ | × | ○ | ○ | × | × | × | × | × | × | ○ | ○ |
| 21 | a-20 | POWER GENERATION+ CHARGING | GENERATOR→CNV2→BAT2 | OFF | × | × | ○ | × | × | × | × | × | CNV | ○ | ○ | × | × | × | × | ○ | × | ○ | ○ |
| | | | | OVER-HEAD WIRE | | | | | MOTOR 1 | | BAT1 | BAT1 | GENE-RATOR | BAT1 | | | | MOTOR 2 | BAT2 | BAT2 | GENE-RATOR | BAT2 | | | |

FIG.43

| FIG. | № | MODE | OPERATION FORM / COMPONENT | 2 PANTO-GRAPH | 11 THIRD HB HB1 | 21 FIRST POWER CON-VERTER | 25 FIRST LB LB11 | 26 SEC-OND LB LB12 | 30 FIRST CON-TAC-TOR SW11 | 40 SEC-OND CON-TAC-TOR SW12 | 33 THIRD CON-TAC-TOR SW13 | 31 FOUR-TH CON-TAC-TOR SW14 | 24 FIRST HB HB21 | 51 SECOND POWER CON-VERTER 2 | 55 THIRD LB LB21 | 56 FOUR-TH LB LB22 | 60 FIFTH CON-TAC-TOR | 70 SIXTH CON-TAC-TOR SW22 | 63 SEVEN-TH CON-TAC-TOR SW23 | 61 EIGHTH CON-TAC-TOR SW24 | 64 SEC-OND HB HB22 | 10 NINTH CON-TAC-TOR SW1 | 5 EN-GINE | 6 GENE-RATOR |
|---|---|---|---|---|---|---|---|---|---|---|---|---|---|---|---|---|---|---|---|---|---|---|---|---|
| 23 | b-1 | START | OVERHEAD WIRE→INV1→ENG START | ON | ○ | INV | ○ | ○ | × | × | × | ○ | × | × | × | × | × | × | × | × | × | × | ○ | ○ |
| 24 | b-2 | START | OVERHEAD WIRE→INV2→ENG START | ON | ○ | × | × | × | × | × | × | × | × | INV | ○ | ○ | × | × | × | × | × | × | ○ | ○ |
| 25 | b-3 | POWER RE-GENERATION | GENERATOR→CNV1→OVERHEAD WIRE | ON | ○ | CNV | ○ | ○ | ○ | × | × | ○ | × | × | × | × | × | × | × | × | × | × | ○ | ○ |
| 26 | b-4 | POWER RE-GENERATION | GENERATOR→CNV2→OVERHEAD WIRE | ON | ○ | × | × | × | × | × | × | × | × | CNV | ○ | ○ | × | × | × | × | × | × | ○ | ○ |
| 27 | b-5 | POWER RUNNING | OVERHEAD WIRE→INV1→MOTOR1 | ON | ○ | INV | ○ | ○ | ○ | × | × | × | × | × | × | × | × | × | × | × | × | × | × | × |
| 28 | b-6 | POWER RUNNING | OVERHEAD WIRE→INV2→MOTOR2 | ON | ○ | × | × | × | × | × | × | × | × | INV | ○ | ○ | ○ | × | × | × | × | × | × | × |
| 29 | b-7 | POWER RUNNING+ POWER GENERATION | OVERHEAD WIRE→INV1→MOTOR1 GENERATOR→CNV2→INV1→MOTOR1 | ON | ○ | INV | ○ | ○ | ○ | × | × | × | × | CNV | ○ | ○ | × | × | × | × | × | × | ○ | ○ |
| 30 | b-8 | POWER RUNNING+ POWER GENERATION | OVERHEAD WIRE→INV2→MOTOR2 GENERATOR→CNV1→INV2→MOTOR2 | ON | ○ | CNV | ○ | ○ | × | × | × | × | × | INV | ○ | ○ | ○ | × | × | × | × | × | ○ | ○ |
| 31 | b-9 | POWER RUNNING+ DISCHARGING | OVERHEAD WIRE→INV1→MOTOR1 BAT2→DC/DC2→INV1→MOTOR1 | ON | ○ | INV | ○ | ○ | ○ | × | × | × | × | DC/DC | ○ | ○ | × | × | × | ○ | ○ | × | × | × |
| 32 | b-10 | POWER RUNNING+ DISCHARGING | OVERHEAD WIRE→INV2→MOTOR2 BAT1→DC/DC1→INV2→MOTOR2 | ON | ○ | DC/DC | ○ | ○ | × | × | × | × | ○ | INV | ○ | ○ | ○ | × | × | × | × | × | × | × |
| 33 | b-11 | POWER RUNNING+ CHARGING | OVERHEAD WIRE→INV1→MOTOR1 OVERHEAD WIRE→DC/DC2→BAT2 | ON | ○ | INV | ○ | ○ | ○ | × | × | × | × | DC/DC | ○ | ○ | × | × | × | ○ | ○ | × | × | × |
| 34 | b-12 | POWER RUNNING+ CHARGING | OVERHEAD WIRE→INV2→MOTOR2 OVERHEAD WIRE→DC/DC1→BAT1 | ON | ○ | DC/DC | ○ | ○ | × | × | × | × | ○ | INV | ○ | ○ | ○ | × | × | × | × | × | × | × |
| 35 | b-13 | RE-GENERATION | MOTOR1→CNV1→OVERHEAD WIRE | ON | ○ | CNV | ○ | ○ | ○ | × | × | × | × | × | × | × | × | × | × | × | × | × | × | × |
| 36 | b-14 | RE-GENERATION | MOTOR2→CNV2→OVERHEAD WIRE | ON | ○ | × | × | × | × | × | × | × | × | CNV | ○ | ○ | ○ | × | × | × | × | × | × | × |
| 37 | b-15 | RE-GENERATION+ ENGINE BRAKE | MOTOR1→CNV1→OVERHEAD WIRE MOTOR1→CNV1→INV2→GENERATOR | ON | ○ | CNV | ○ | ○ | ○ | × | × | × | × | INV | ○ | ○ | ○ | × | × | × | × | × | ○ | ○ |
| 38 | b-16 | RE-GENERATION+ ENGINE BRAKE | MOTOR2→CNV2→OVERHEAD WIRE MOTOR2→CNV2→INV1→GENERATOR | ON | ○ | INV | ○ | ○ | ○ | × | × | × | × | CNV | ○ | ○ | ○ | × | × | × | × | × | ○ | ○ |
| 39 | b-17 | RE-GENERATION+ CHARGING | MOTOR1→CNV1→DC/DC2→BAT2 | ON | ○ | CNV | ○ | ○ | ○ | × | × | × | × | DC/DC | ○ | ○ | × | × | × | ○ | ○ | × | × | × |
| 40 | b-18 | RE-GENERATION+ CHARGING | MOTOR2→CNV2→DC/DC1→BAT1 | ON | ○ | DC/DC | ○ | ○ | × | × | × | × | ○ | CNV | ○ | ○ | ○ | × | × | × | × | × | × | × |
| 41 | b-19 | CHARGING/ DISCHARGING | OVERHEAD WIRE→DC/DC1→BAT1 | ON | ○ | DC/DC | ○ | ○ | × | × | × | × | ○ | × | × | × | × | × | × | × | × | × | × | × |
| 42 | b-20 | CHARGING/ DISCHARGING | OVERHEAD WIRE→DC/DC2→BAT2 | ON | ○ | × | × | × | × | × | × | × | × | DC/DC | ○ | ○ | × | × | × | ○ | ○ | × | × | × |
| | | | | | OVER-HEAD WIRE | | | | MOTOR 1 | BAT1 | BAT1 | GENE-RATOR | BAT1 | | | | MOTOR 2 | | | BAT2 | GENE-RATOR | BAT2 | | |

PROPULSION CONTROL APPARATUS OF ELECTRIC MOTOR VEHICLE AND CONTROL METHOD FOR PROPULSION CONTROL APPARATUS

FIELD

The present invention relates to a propulsion control apparatus for an electric motor vehicle including a power storage device and a control method for the propulsion control apparatus.

BACKGROUND

Conventionally, for example, Patent Literature 1 discloses, as a railroad vehicle, a configuration including a generator linked to an engine through a power transmission device, a rectifier that converts an output of the generator into a direct current, an inverter connected to the rectifier, a motor linked to the inverter, an energy storage device branching from and linked to a wire between the rectifier and the inverter, an energy control device connected among the rectifier, the inverter, and the energy storage device.

Patent Literature 2 discloses, as a driving system of a railroad vehicle, a configuration including an engine, a generator that converts an axial rotating force generated by the engine into alternating-current power, an AC/DC converter that converts the alternating-current power generated by the generator into direct-current power and supplies the direct-current power to power transmitting means, an inverter device that converts the direct-current power supplied by the power transmitting means into three-phase alternating-current power and drives an electric motor, and a system integrated control device that controls the engine, the generator, the AC/DC converter, the inverter device, and the electric motor.

Patent Literature 2 also discloses a configuration including power storage means instead of the engine and the generator, which are power generating means. In this case, the configuration includes a DC/DC converter instead of the AD/DC converter.

CITATION LIST

Patent Literature

Patent Literature 1: Japanese Patent Application Laid-Open No. 2003-134604
Patent Literature 2: Japanese Patent Application Laid-Open No. 2010-088145

SUMMARY

Technical Problem

In the configuration disclosed in Patent Literature 1, although the railroad vehicle includes the energy storage device functioning as a power storage device, the railroad vehicle is a hybrid vehicle that does not use overhead wire power. The energy storage device is directly connected to an input stage of the inverter, which is a DC/AC converter. Therefore, it is difficult to use the railroad vehicle as a railroad vehicle that uses the overhead wire power.

In this regard, in Patent Literature 2, when the engine and the generator are used as power generating means, the AD/DC converter adjusts a voltage difference between the power generating means and an overhead wire voltage. When the power storage device is used as the power generating means, the DC/DC converter adjusts a voltage difference between the power storage device and the overhead wire voltage.

However, in the idea of Patent Literature 2, when the conventional hybrid vehicle adopts a system configuration that uses three kinds of electric power by the overhead wire power, the engine and the generator, and the power storage device, three power converters are necessary, wherein an inverter, which is a DC/AC converter for driving the electric motor, a converter, which is an AC/DC converter for adjusting an alternating-current voltage generated by the engine and the generator to an overhead wire voltage, and a DC/DC converter for adjusting an alternating-current voltage generated by the engine and the generator to the overhead wire voltage are included. Therefore, there is a problem in that an increase in costs, an increase in the size of the apparatus, and an increase in mass are caused.

The present invention has been devised in view of the above and it is an object of the present invention to provide a propulsion control apparatus of an electric motor vehicle and a control method for the propulsion control apparatus that do not cause an increase of power converters even when the conventional hybrid vehicle is enabled to be used even with the overhead wire power.

Solution to Problem

In order to solve the aforementioned problems, a propulsion control apparatus of an electric motor vehicle according to one aspect of the present invention is configured to include: a first power converter that is connectable to a direct-current common section, operates as a DC/AC converter when direct-current power is input from the direct-current common section, converts the direct-current power into desired alternating-current power and supplies the desired alternating-current power to a motor that generates a driving force for a vehicle, operates as an AC/DC converter according to necessity when regenerative power of the motor is input from the motor side, and supplies the regenerative power to the direct-current common section; a second power converter that operates as an AC/DC converter when alternating-current power supplied from an alternating-current power supply source is input from a first input and output end side, converts the alternating-current power into direct-current power and outputs the direct-current power to the direct-current common section via a second input and output end different from the first input and output end, operates as a DC/AC converter and output desired direct-current power to the first input and output end side when direct-current power supplied from the direct-current common section is input from the second input and output end side, operates as a DC/DC converter and outputs desired direct-current power to the second input and output end side when direct-current power is input from the first input and output end side, and operates as the DC/DC converter and outputs desired direct-current power to the first input and output end side when direct-current power is input from the second input and output end side; a power storage device functioning as a direct-current power supply source that is configured to be connectable to the direct-current common section and the first input and output end side and charged with direct-current power supplied from the direct-current common section or the first input and output end side or discharges direct-current power to the direct-current common section or the first input and output end side; and a control device that controls operations of the first power converter, the second power converter, and the power storage device.

Advantageous Effects of Invention

According to the present invention, an AC/DC conversion function, a DC/AC conversion function, and a DC/DC conversion function are provided in the first power converter and the AC/DC conversion function, the DC/AC conversion function, and the DC/DC conversion function are provided in the second power converter. Therefore, there is an effect that it is possible to provide a propulsion control apparatus of an electric motor vehicle and a control method for the propulsion control apparatus that do not cause an increase of power converters even when the conventional hybrid vehicle (a hybrid of an engine driving generator and a power storage device) is enabled to be used even with the overhead wire power.

BRIEF DESCRIPTION OF DRAWINGS

FIG. 22 is a diagram of a list in a table format of the operations shown in FIG. 2 to FIG. 21.

FIG. 43 is a diagram of a list in a table format of the operations shown in FIG. 23 to FIG. 42.

DESCRIPTION OF EMBODIMENTS

Propulsion control apparatuses of electric motors vehicle (hereinafter simply referred to as "propulsion control apparatus") and control methods for the propulsion control apparatuses according to embodiments of the present invention are explained below with reference to the accompanying drawings. Note that the present invention is not limited by the embodiments explained below.

Embodiment

Figure 1:
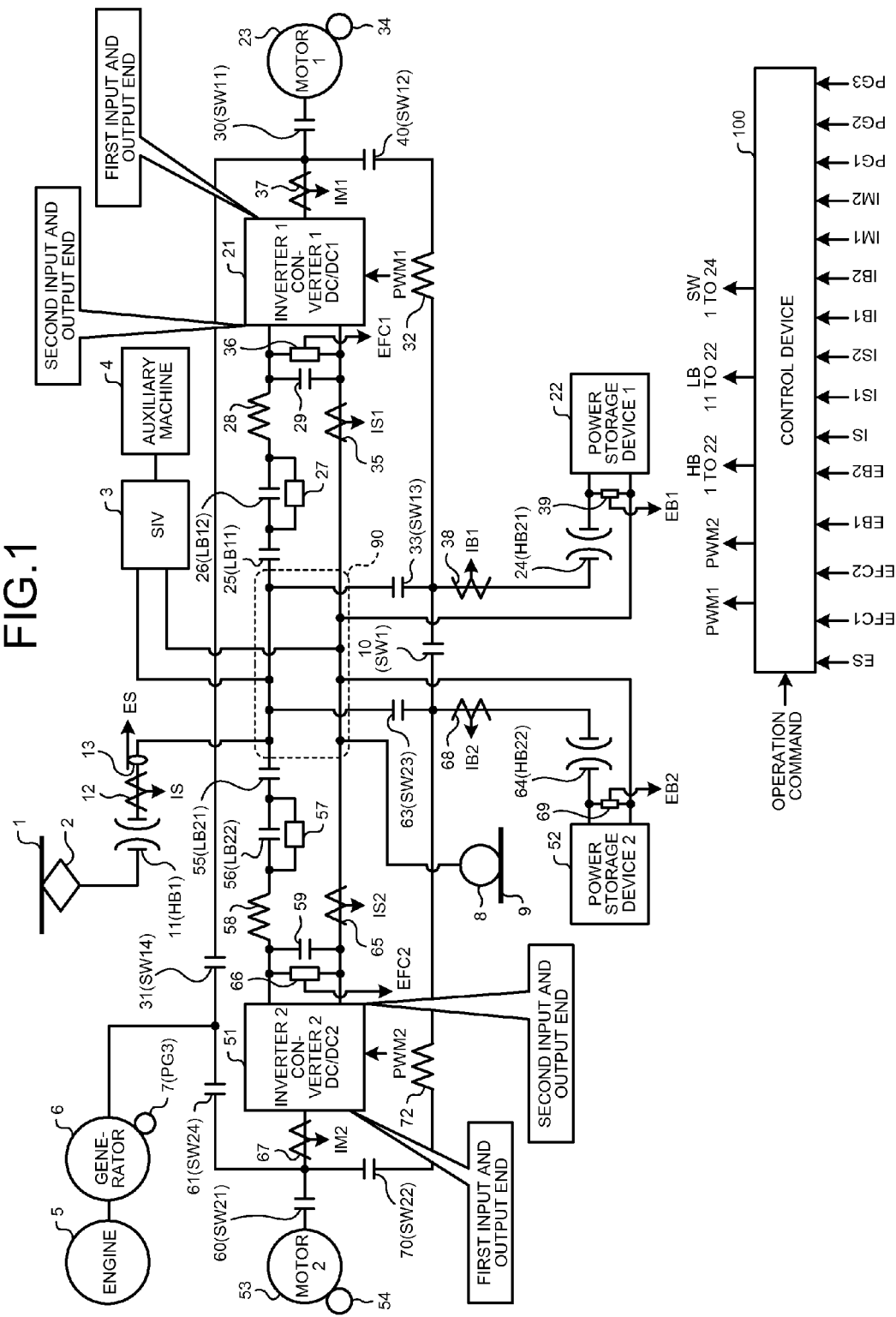
FIG. 1 is a diagram of a configuration example of a hybrid vehicle system including a propulsion control apparatus according to an embodiment.

FIG. 1 is a diagram of a configuration example of a hybrid vehicle system including a propulsion control apparatus according to an embodiment of the present invention. The hybrid vehicle system is configured to receive a direct-current power from a direct-current overhead wire 1 via a direct-current pantograph 2 and supply (apply) the received direct-current power to a direct-current common section 90 via a first circuit breaker 11. Note that a negative side of the direct-current common section 90 is in contact with a rail 9 via a wheel 8.

The hybrid vehicle system includes, as main components, a first motor 23, a second motor 53, a first power converter 21, a second power converter 51, a first power storage device 22, a second power storage device 52, an auxiliary power supply device (Static Inverter, hereinafter referred to as "SIV") 3, an auxiliary machine 4, an engine 5, a generator 6, a first filter capacitor 29, a first filter reactor 28, a first reactor 32, a second filter capacitor 59, a second filter reactor 58, a second reactor 72, and a control device 100 that controls the operation of the entire hybrid vehicle system.

Further, the hybrid vehicle system includes a first line breaker 25, a second line breaker 26, a third circuit breaker 24, a second circuit breaker 64, a third contactor 33, a fourth contactor 63, a second contactor 40, a sixth contactor 70, an eighth contactor 61, a third line breaker 55, and a fourth line breaker 56, which are interposed among the main components to freely change a supply path of electric power. A first charging resistor 27 is connected to the second line breaker 26 in parallel. A second charging resistor 57 is connected to the fourth line breaker 56 in parallel.

Note that the hybrid vehicle system includes, in addition to the components, an overhead-wire-current detector 12, a first direct current detector 35, a first power-converter-output-current detector 37, a second direct current detector 65, and a second power-storage-device-current detector 68 that detect electric currents of important places. The hybrid vehicle system includes an overhead-wire-voltage detector 13, a first filter-capacitor-voltage detector 36, a first power-converter-output-current detector 37, a first power-storage-device-voltage detector 39, a second filter-capacitor-voltage detector 66, and a second power-storage-device-voltage detector 69 that detect voltages in important places. Further, the hybrid vehicle system includes a first speed detector 7, a second speed detector 34, and a third speed detector 54 that detect the number of revolutions of the generator 6, the first motor 23, and of the second motor 53.

A connection relation and schematic functions of the units configuring the hybrid vehicle system are explained.

The engine 5 is connected to the generator 6, which is one of power supply sources that generate electric power. The generator 6 is an alternating-current generator driven by the engine 5. That is, the engine 5 and the generator 6 function as an alternating-current power supply source. The generator 6 is connected to the first power converter 21 via a tenth contactor 31 and further connected to the second power converter 51 via the eighth contactor 61. The generator 6 is driven by the first power converter 21 or the second power converter 51 to operate as an alternating-current electric motor as well.

The first power storage device 22 is a storage device for electric energy including a lithium ion battery, a nickel hydrogen battery, an electric double layer capacitor, a lithium ion capacitor, a flywheel, or the like as storing means. The first power storage device 22 is connected as another power supply source, which generates electric power, to the direct-current common section 90 via the third contactor 33 and the third circuit breaker 24 and to the first power converter 21 via the second contactor 40 and charges and discharges direct-current power. Like the first power storage device 22, the second power storage device 52 is a storage device for electric energy. The second power storage device 52 is connected as another power supply source, which generates electric power, to the direct-current common section 90 via the fourth contactor 63 and the second circuit breaker 64 and to the second power converter 51 via the sixth contactor 70 and charges and discharges direct-current power.

The first power converter 21 operates as an AC/DC converter, a DC/AC converter, or a DC/DC converter. When the first power converter 21 operates as the AC/DC converter, regenerative power from the first motor 23 or alternating-current power generated by the generator 6 is converted into direct-current power and supplied to the direct-current common section 90. When the first power converter 21 operates as the DC/AC converter, direct-current power from the first power storage device 22 or the direct-current overhead wire 1 supplied via the direct-current common section 90 is converted into alternating-current power. The alternating-current power is supplied to the generator 6 or the first motor 23. The generator 6 operates as an alternating-current electric motor with the alternating-current power and drives the engine 5. The first motor 23 is driven by this alternating-current power. When the first power converter 21 operates as the DC/DC converter, direct-current power from the direct-current overhead wire 1 or the second power converter 51 supplied via the direct-current common section 90 is converted into desired direct-current power and charges the first power storage device 22.

The second power converter 51 operates as an AC/DC converter, a DC/AC converter, or a DC/DC converter. When the second power converter 51 operates as the AC/DC converter, regenerative power from the second motor 53 or alternating-current power generated by the generator 6 is converted into direct-current power and supplied to the direct-current common section 90. When the second power converter 51 operates as the DC/AC converter, direct-current power from the second power storage device 52 or from the direct-current overhead wire 1 supplied via the direct-current common section 90 is converted into alternating-current power. This alternating-current power is supplied to the generator 6 or the second motor 53. The generator 6 operates as an alternating-current electric motor with this alternating-current power and drives the engine 5. The second motor 53 is driven by this electric power. When the second power converter 51 operates as the DC/DC converter, direct-current power from the direct-current overhead wire 1 or from the first power converter 21 supplied via the direct-current common section 90 is converted into desired direct-current power and charged in the second power storage device 52.

The first motor 23 receives the supply of the alternating-current power from the first power converter 21 and generates a driving force (a propulsion force). The second motor 53 receives the supply of the alternating-current power from the second power converter 51 and generates a driving force. The SIV 3 is connected to the direct-current common section 90, and converts direct-current power supplied via the direct-current common section 90 into alternating-current power having a constant voltage/a constant frequency and supplies the alternating-current power to the auxiliary machine 4 such as lighting or an air conditioner. Note that the auxiliary machine 4 is a general term of load apparatuses other than a driving apparatus.

The first line breaker 25 and the second line breaker 26 are connected in series and inserted between the direct-current common section 90 and the first power converter 21. The first filter reactor 28 is inserted between the second line breaker 26 and the first power converter 21. The third line breaker 55 and the fourth line breaker 56 are connected in series and inserted between the direct-current common section 90 and the second power converter 51. The second filter reactor 58 is inserted between the fourth line breaker 56 and the second power converter 51.

Similarly, the third contactor 33 is inserted between the first power storage device 22 and the direct-current common section 90. The second contactor 40 is inserted between the first power storage device 22 and the first power converter 21. The tenth contactor 31 is inserted between the generator 6 and the first power converter 21. The fourth contactor 63 is inserted between the second power storage device 52 and the direct-current common section 90. The sixth contactor 70 is inserted between the second power storage device 52 and the second power converter 51. The eighth contactor 61 is inserted between the generator 6 and the second power converter 51.

One end of the third contactor 33 and one end of the second contactor 40 are connected on the side of the first power storage device 22. The third circuit breaker 24 is inserted between the connected ends and the first power storage device 22. One end of the fourth contactor 63 and one end of the sixth contactor 70 are connected on the side of the second power storage device 52. The second circuit breaker 64 is inserted between the connected ends and the second power storage device 52.

Next, sensors are explained. An overhead wire voltage detector 13 detects an overhead wire voltage ES. An overhead wire current detector 12 detects an overhead wire current IS. A first filter capacitor voltage detector 36 detects a voltage (a first filter capacitor voltage) EFC1 of the first filter capacitor 29. A first direct current detector 35 detects a direct current (a first direct current) IS1 flowing into and flowing out from the first power converter 21. A first power converter output current detector 37 detects an alternating current (a first alternating current) IM1 flowing into and flowing out from the first power converter 21.

Similarly, a second filter capacitor voltage detector 66 detects a voltage (a second filter capacitor voltage) EFC2 of the second filter capacitor 59. A second direct current detector 65 detects a direct current (a second direct current) IS2 flowing into and flowing out from the second power converter 51. A second power converter output current detector detects an alternating current (a second alternating current) IM2 flowing into and flowing out from the second power converter 51.

The first power-storage-device-current detector 38 detects a direct current (a power storage device current) IB1 flowing into and out of the first power storage device 22. The second power-storage-device-current detector 68 detects a direct current (a power storage device current) IB2 flowing into and out of the second power storage device 52. The first speed detector 7 detects rotating speed (generator rotating speed) PG1 of the generator 6. The second speed detector 34 detects rotating speed (motor rotating speed) PG2 of the first motor 23. The third speed detector 54 detects rotating speed (motor rotating speed) PG3 of the second motor 53. The first power-storage-device-voltage detector 39 detects a voltage (a power storage device voltage) EB1 of the first power storage device 22. The second power-storage-device-voltage detector 69 detects a voltage (a power storage device voltage) EB2 of the second power storage device 52.

Detection values detected by the sensors are input to the control device 100 as shown in the figure. An operation command from a not-shown motorman's cab is also input to the control device 100. The control device 100 switches an operation mode of a vehicle according to the operation command. The control device 100 generates, on the basis of the detection values output from the various sensors, signals (PWM1 and PWM2) for controlling not-shown switching elements of the power converters, signals (HB1 to HB22) for controlling ON/OFF of the circuit breakers, signals (LB11 to LB22) for controlling ON/OFF of the line breakers, and signals (SW1 to SW24) for controlling ON/OFF of the contactors and outputs the signals to the control target sections. Note that, in FIG. 1, to avoid complication, control signals for the circuit breakers, the line breakers, and the contactors are not shown.

Operations corresponding to the operation commands in the propulsion control apparatus in the first embodiment are explained. Note that, when required electric power is supplied to the direct-current common section 90, the SIV 3 is turned on and required electric power is supplied to the auxiliary machine 4 (a light, an air conditioner, a control power supply, and the like). Note that explanation concerning the subsequent operations of the SIV 3 and the auxiliary machine 4 is omitted.

When an operation command "power running by overhead wire power" is input, the control device 100 controls the first line breaker 25 to be turned on and charges the first filter capacitor 29 via the first filter reactor 28 while limiting an electric current with the first charging resistor 27. When the control device 100 confirms with a voltage value detected by the first filter-capacitor-voltage detector 36 that the first filter capacitor 29 has been charged up to a predetermined voltage, the control device 100 turns on the second line breaker 26 and short-circuits the first charging resistor 27. The first power converter 21 converts direct-current power into alternating-current power and drives the first motor 23 to thereby cause the vehicle to travel.

Similarly, when the operation command "power running by overhead wire power" is input, the control device 100 controls the third line breaker 55 to be turned on and charges the second filter capacitor 59 via the second filter reactor 58 while limiting an electric current with the second charging resistor 57. When the control device 100 confirms with a voltage value detected by the second filter-capacitor-voltage detector 66 that the second filter capacitor 59 has been charged up to a predetermined voltage, the control device 100 turns on the fourth line breaker 56 and short-circuits the second charging resistor 57. The second power converter 51 converts direct-current power into alternating-current power and drives the second motor 53 to thereby cause the vehicle to travel.

When an operation command "brake" after the power running is input, the control device 100 causes the first motor 23 to operate as a generator, converts generated alternating-current power into direct-current power with the first power converter 21, and returns the direct-current power to the direct-current overhead wire 1. When an overhead wire voltage is higher than a predetermined voltage, the control device 100 stops the vehicle with a not-shown air brake.

Similarly, when the operation command "brake" after the power running is input, the control device 100 causes the second motor 53 to operate as a generator, converts generated alternating-current power into direct-current power with the second power converter 51, and returns the direct-current power to the direct-current overhead wire 1. When an overhead wire voltage is higher than the predetermined voltage, the control device 100 stops the vehicle with the not-shown air brake.

When an operation command "charge" is input, the control device 100 turns on the first line breaker 25 and charges the first filter capacitor 29 via the first filter reactor 28 while limiting an electric current with the first charging resistor 27. When the control device 100 confirms with a voltage value detected by the first filter-capacitor-voltage detector 36 that the first filter capacitor 29 has been charged up to the predetermined voltage, the control device 100 turns on the second line breaker 26 and short-circuits the first charging resistor 27. Further, the control device 100 turns on the second contactor 40 and turns on the third circuit breaker 24. The first power converter 21 converts an overhead wire voltage of the direct-current overhead wire 1 into a voltage of the first power storage device 22 and charges the first power storage device 22 via the first reactor 32.

Similarly, when the operation command "charge" is input, the control device 100 turns on the third line breaker 55 and charges the second filter capacitor 59 via the second filter reactor 58 while limiting an electric current with the second charging resistor 57. When the control device 100 confirms with a voltage value detected by the second filter-capacitor-voltage detector 66 that the second filter capacitor 59 has been charged up to the predetermined voltage, the control device 100 turns on the fourth line breaker 56 and short-circuits the second charging resistor 57. Further, the control device 100 turns on the sixth contactor 70 and turns on the second circuit breaker 64. The second power converter 51 converts an overhead wire voltage of the direct-current overhead wire 1 into a voltage of the second power storage device 52 and charges the second power storage device 52 via the second reactor 72.

When an operation command "discharge" is input, the control device 100 converts a voltage of the first power storage device 22 into an overhead wire voltage of the direct-current overhead wire 1 with the first power converter 21 and discharges the overhead wire voltage to the direct-current overhead wire 1.

Similarly, when the operation command "discharge" is input, the control device 100 converts a voltage of the second power storage device 52 into an overhead wire voltage of the direct-current overhead wire 1 with the second power converter 51 and discharges the overhead wire voltage to the direct-current overhead wire 1.

When an operation command "start (engine start)" is input, the control device 100 turns on the first line breaker 25 and charges the first filter capacitor 29 via the first filter reactor 28 while limiting an electric current with the first charging resistor 27. When the control device 100 confirms with a voltage detected by the first filter-capacitor-voltage detector 36 that the first filter capacitor 29 has been charged up to the predetermined voltage, the control device 100 turns on the second line breaker 26 and short-circuits the first charging resistor 27. Further, the control device 100 turns on the tenth contactor 31. The first power converter 21 converts direct-current power into alternating-current power and drives the generator 6 to start the engine 5. Note that, the control device 100 performs, after the driving of the generator 6, according to necessity, control for supplying excess power of the generator 6 to the direct-current overhead wire 1 through the first power converter 21 or control for charging the first power storage device 22 with the excess power.

Similarly, when the operation command "start (engine start)" is input, the control device 100 turns on the third line breaker 55 and charges the second filter capacitor 59 via the second filter reactor 58 while limiting an electric current with the second charging resistor 57. When the control device 100 confirms with a voltage detected by the second filter-capacitor-voltage detector 66 that the second filter capacitor 59 has been charged up to the predetermined voltage, the control device 100 turns on the fourth line breaker 56 and short-circuits the second charging resistor 57. Further, the control device 100 turns on the eighth contactor 61. The second power converter 51 converts direct-current power into alternating-current power and drives the generator 6 to start the engine 5. Note that, the control device 100 performs, after the driving of the generator 6, according to necessity, control for supplying excess power of the generator 6 to the direct-current overhead wire 1 through the second power converter 51 or control for charging the second power storage device 52 with the excess power.

When an operation command "power running by stored power" is input, the control device 100 turns on the first line breaker 25 and charges the first filter capacitor 29 via the first filter reactor 28 while limiting an electric current with the first charging resistor 27. When the control device 100 detects with the first filter-capacitor-voltage detector 36 that the first filter capacitor 29 has been charged up to the predetermined voltage, the control device 100 turns on the second line breaker 26 and short-circuits the first charging resistor 27. The control device 100 converts direct-current power into alternating-current power with the first power converter 21 and drives the first motor 23 to cause the vehicle to travel.

Similarly, when the operation command "power running by stored power" is input, the control device 100 turns on the third line breaker 55 and charges the second filter capacitor 59 via the second filter reactor 58 while limiting an electric current with the second charging resistor 57. When the control device 100 detects with the second filter-capacitor-voltage detector 66 that the second filter capacitor 59 has been charged up to the predetermined voltage, the control device 100 turns on the fourth line breaker 56 and short-circuits the second charging resistor 57. The control device 100 converts direct-current power into alternating-current power with the second power converter 51 and drives the second motor 53 to cause the vehicle to travel.

When the operation command "brake" after the power running is input, the control device 100 causes the first motor 23 to operate as the generator, converts generated alternating-current power into direct-current power with the first power converter 21, and charges the first power storage device 22. When the first power storage device 22 is fully charged, the control device 100 stops the charging and stops the vehicle with the not-shown air brake.

Similarly, when the operation command "brake" after the power running is input, the control device 100 causes the second motor 53 to operate as the generator, converts generated alternating-current power into direct-current power with the second power converter 51, and charges the second power storage device 52. When the second power storage device 52 is fully charged, the control device 100 stops the charging and stops the vehicle with the not-shown air brake.

When an operation command "power running by generated power" is input, the control device 100 converts power generated by the generator 6 driven by the engine 5 into direct-current power with the second power converter 51, converts the direct-current power into alternating-current power with the first power converter 21 to drive the first motor 23, and causes the vehicle to travel. Note that the control device 100 performs control for adjusting charging and discharging of generated power and stored power according to power running power.

Similarly, when the operation command "power running by generated power" is input, the control device 100 converts power generated by the generator 6 driven by the engine 5 into direct-current power with the first power converter 21, converts the direct-current power into alternating-current power with the second power converter 51 to drive the second motor 53, and causes the vehicle to travel. Note that the control device 100 performs control for adjusting charging and discharging of generated power and stored power according to power running power.

Operations for each traveling section (an electrified section and a non-electrified section) in the propulsion control apparatus in the embodiment are explained.

First, an operation during electrified section traveling is explained. As a preparation for starting traveling in the electrified section, the control device 100 turns off the fourth contactor 63, separates the second power storage device 52 from the direct-current common section 90, turns off the eighth contactor 61, and separates the generator 6 from the second power converter 51. The control device 100 turns on the second circuit breaker 64, turns on the sixth contactor 70, connects the second power storage device 52 to the second power converter 51 via the second reactor 72, and causes the second power converter 51 to operate as the DC/DC converter.

When the control device 100 receives a "power running command" from the motorman's cab, the control device 100 lifts the direct-current pantograph 2 and receives direct-current power from the direct-current overhead wire 1. At this point, the control device 100 turns on the first circuit breaker 11 and supplies the direct-current power of the direct-current overhead wire 1 to the direct-current common section 90. The control device 100 charges the first filter capacitor 29 with the first line breaker 25, the second line breaker 26, and the first charging resistor 27, causes the first power converter 21 to operate as the DC/AC converter, converts the direct-current power into alternating-current power, and drives the first motor 23 to cause the vehicle to travel. The control device 100 causes the second power converter 51 to operate as the DC/DC converter, converts an output voltage of the second power storage device 52 into an overhead wire voltage, and supplements the direct-current power to suppress fluctuation in the overhead wire voltage when the fluctuation exceeds a predetermined range.

Thereafter, when the control device 100 receives a "brake command" from the motorman's cab, the control device 100 causes the first motor 23 to operate as the generator, causes the first power converter 21 to operate as the AC/DC converter, converts the alternating-current power into a direct-current power, and returns the direct-current power to the direct-current overhead wire 1. Note that a part of the electric power is supplied to the auxiliary machine 4 from the SIV 3. When the voltage of the direct-current overhead wire 1 becomes higher than the predetermined voltage, the electric power cannot be returned to the direct-current overhead wire 1. Therefore, the control device 100 causes the second power converter 51 to operate as the DC/DC converter and charges excess power in the second power storage device 52.

Note that, when an SOC of the second power storage device 52 is higher than a predetermined value, the charging in the second power storage device 52 cannot be performed. Therefore, in a state in which the second power storage device 52 is separated from the direct-current common section 90, the control device 100 converts regenerative power into direct-current power with the first power converter 21, further converts the direct-current power into alternating-current power with the second power converter 51, drives the generator 6 as a motor, and causes the engine 5 to consume the regenerative power.

On the other hand, contrary to the above, when the SOC of the second power storage device 52 is lower than the predetermined value, the control device 100 turns on the second circuit breaker 64, turns on the sixth contactor 70, causes the second power converter 51 to operate as the DC/DC converter, and charges the regenerative power in the second power storage device 52 via the second reactor 72.

Next, an operation during non-electrified section traveling is explained. The control device 100 turns off the fourth contactor 63, separates the second power storage device 52 from the direct-current common section 90, turns off the eighth contactor 61, and separates the generator 6 from the second power converter 51. The control device 100 turns on the second circuit breaker 64, turns on the sixth contactor 70, connects the second power storage device 52 to the second power converter 51 via the second reactor 72, and causes the second power converter 51 to operate as the DC/DC converter. The control device 100 converts discharged power of the second power storage device 52 into direct-current power with the second power converter 51, causes the first power converter 21 to operate as the DC/AC converter, further converts the direct-current power into alternating-current to drive the first motor 23, and causes the vehicle to travel. In this embodiment, because the vehicle travels with electric power of the second power storage device 52, noise is extremely low. For example, engine sound and wind noise of a pantograph do not occur.

Thereafter, when determining according to predetermined speed, a predetermined distance, a predetermined time, or the like that the vehicle has left a place crowded with people such as a station, the control device 100 converts the discharged power (direct-current power) of the second power storage device 52 into alternating-current power with the second power converter 51, drives the generator 6 as the motor, and starts the engine 5. Further, the control device 100 controls the second circuit breaker 64 to be turned off, controls the fourth contactor 63 to be turned off, and releases the second power storage device 52 from the direct-current common section 90. The control device 100 causes the second power converter 51 to operate as the DC/DC converter, converts the generated power (alternating-current power) of the generator 6 driven by the engine 5 into direct-current power, converts the direct-current power into alternating-current power with the first power converter 21 to drive the first motor 23, and accelerates the vehicle. Note that, at this point, the second power converter 51 is controlled such that a direct-current voltage, which is an output voltage, is constant. That is, in the control, electric power contributing to the vehicle traveling is the power generated by the generator 6 rather than the electric power of the second power storage device 52.

Further, the control device 100 performs control for increasing an intermediate direct-current voltage (the voltage of the direct-current common section 90) with the second power converter 51 and controls the intermediate direct-current voltage to be a direct-current overhead wire voltage. At this point, it is preferable to adjust the method of increasing the direct-current voltage not to change a pulse mode of the first power converter 21. According to such control, an effect is obtained that it is made possible to suppress a change of electromagnetic sound due to the change of the pulse mode (an asynchronous PWM, a synchronous PWM, etc.) of the first power converter 21 and it is made possible to suppress unpleasant sound due to a change of the electromagnetic sound.

By increasing the intermediate direct-current voltage, it is made possible to equalize motor performance during the non-electrified section traveling to motor performance obtained when the overhead wire power is used. There is an effect in a reduction of the size and the weight of the apparatus.

When the control device 100 receives the "brake command" from the motorman's cab during the traveling of the vehicle, the control device 100 changes the braking method according to vehicle speed and a state of charging (SOC) of the second power storage device 52. This is because the magnitude of regenerative power is substantially proportional to the level of the speed of the vehicle and, therefore, regenerative power that can be charged in the second power storage device 52 is limited according to the state of charging of the power storage device. As a result, the remaining electric power is consumed by the engine 5 and the generator 6 or the vehicle is stopped by the not-shown air brake. A part of the electric power is supplied to the auxiliary machine 4 from the SIV 3 and consumed.

When the vehicle speed is high and the SOC is high, the regenerative power can hardly be charged in the second power storage device 52. Therefore, in a state in which the second power storage device 52 is separated from the direct-current common section 90, the control device 100 causes the first motor 23 to operate as the generator, converts the regenerative power into direct-current power with the first power converter 21, further converts the direct-current power into alternating-current power with the second power converter 51, drives the generator 6 as the motor, and causes the engine 5 to consume the regenerative power.

When the vehicle speed is high and the SOC is low, the control device 100 turns on the second circuit breaker 64, turns on the sixth contactor 70, causes the second power converter 51 to operate as the DC/DC converter, and charges the regenerative power in the second power storage device 52 via the second reactor 72.

On the other hand, when the vehicle speed is low, the control device 100 turns on the second circuit breaker 64, turns on the fourth contactor 63, connects the second power storage device 52 to the direct-current common section 90, and charges the second power storage device 52 with the regenerative power supplied from the first power converter 21.

Next, operations for each mode in the propulsion control apparatus in the embodiment are explained with reference to FIG. 2 to FIG. 42. In these figures, the schematic configuration of the propulsion control apparatus for explaining operations corresponding to each mode of the propulsion control apparatus is shown. According to the figures, the direct-current overhead wire 1, the first power converter 21, the second power converter 51, the first power storage device 22, and the second power storage device 52 are electrically connected via the direct-current common section 90. According to the schematic configuration diagrams, the generator 6, the first motor 23, and the first power storage device 22 are also electrically connected to a first input and output end located on the opposite side of the direct-current common section 90 in the first power converter 21. The generator 6, the second motor 53, and the second power storage device 52 are also electrically connected to a first input and output end located on the opposite side of the direct-current common section 90 in the second power converter 21. The direct-current common section 90 is also electrically connected to a second input and output end different from the first input and output end in the first power converter 21. The direct-current common section 90 is also connected to a second input and output end different from the first input and output end in the second power storage device 52.

Note that, in FIG. 2 to FIG. 42, the engine 5, the first motor 23, the second motor 53, the first power storage device 22, and the second power storage device 52 in the configuration shown in FIG. 1 are respectively written as "ENG", "M1", "M2", "BAT1", and "BAT2". The first power converter 21 and the second power converter 51 are written by focusing on functions thereof. Specifically, when the first power converter 21 operates as the AC/DC converter, the first power converter 21 is written as "CNV". When the first power converter 21 operates as the DC/AC converter, the first power converter 21 is written as "INV". Similarly, when the second power converter 51 operates as the AC/DC converter, the second power converter 51 is written as "CNV". When the second power converter 51 operates as the DC/AC converter, the second power converter 51 is written as "INV". When the second power converter 51 operates as the DC/DC converter, the second power converter 51 is written as "DC/DC". Note that, in the following explanation, a nominal voltage of the direct-current overhead wire 1 is set to, for example, 1500 Vdc and a full-charge voltage of the second power storage device 52 is set to, for example, 600 Vdc.

(a-1: Start)

Figure 2:
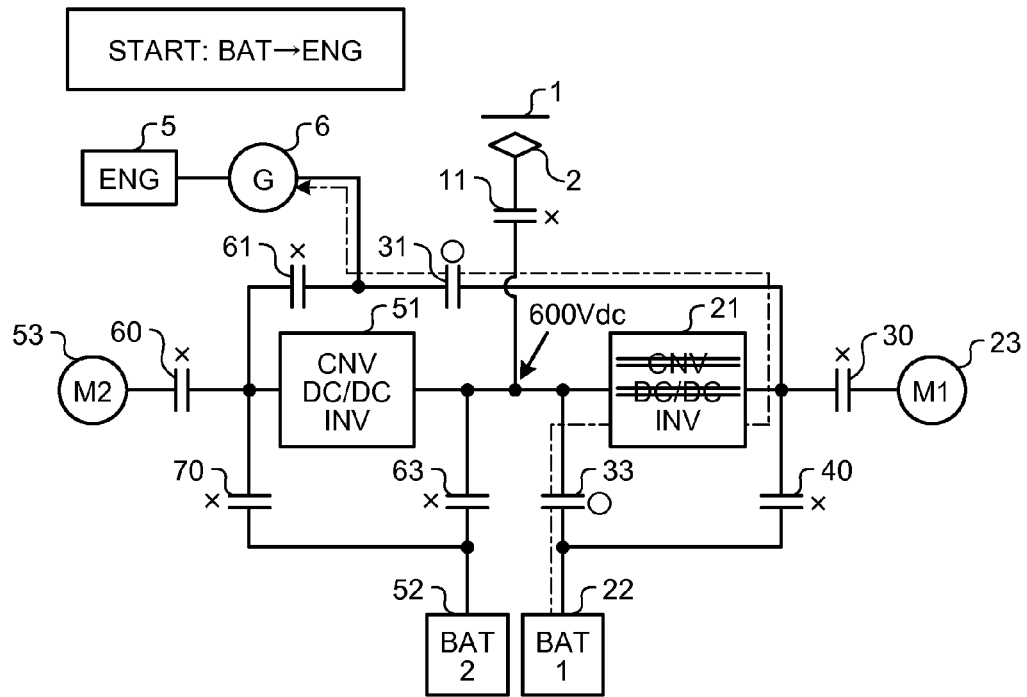
FIG. 2 is a diagram of an operation in which an engine start is performed using electric power of a first power converter.

FIG. 2 is a diagram of an operation in which an engine start is performed using electric power of the first power converter 21. As shown in the figure, when the engine start is performed using the electric power of the first storage device 22, the direct-current pantograph 2 is lowered, the first circuit breaker 11 is controlled so as to be turned off, the eighth contactor 61 is controlled so as to be turned off, the tenth contactor 31 is controlled so as to be turned on, a fifth contactor 60 is controlled so as to be turned off, a first contactor 30 is controlled so as to be turned off, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 operates as the DC/AC converter (INV), converts a low direct-current voltage applied from the first power storage device 22 into a three-phase alternating-current voltage to drive the generator 6 as the motor, and starts the engine 5 connected to the generator 6.

(a-2: Start)

Figure 3:
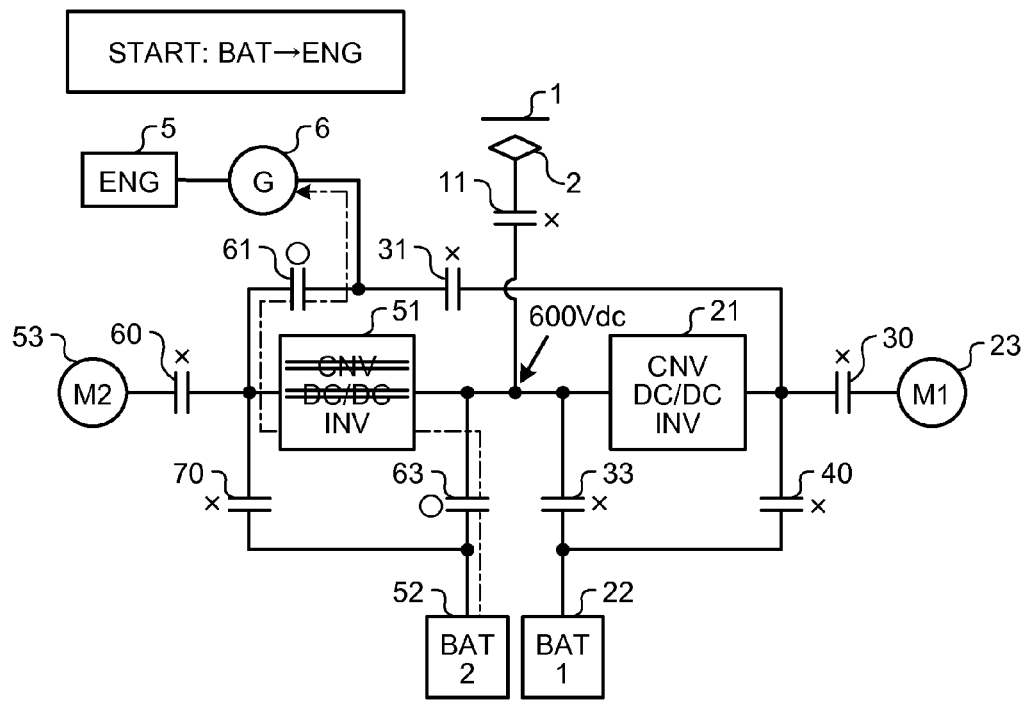
FIG. 3 is a diagram of an operation in which the engine start is performed using electric power of a second power storage device.

FIG. 3 is a diagram of an operation in which an engine start is performed using electric power of the second power storage device 52. As shown in the figure, when the engine start is performed using the electric power of the second power storage device 52, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned off, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 operates as the DC/AC converter (INV), converts a low direct-current voltage applied from the second power storage device 52 into a three-phase alternating-current voltage to drive the generator 6 as the motor, and starts the engine 5 connected to the generator 6.

(a-3: Power Running)

Figure 4:
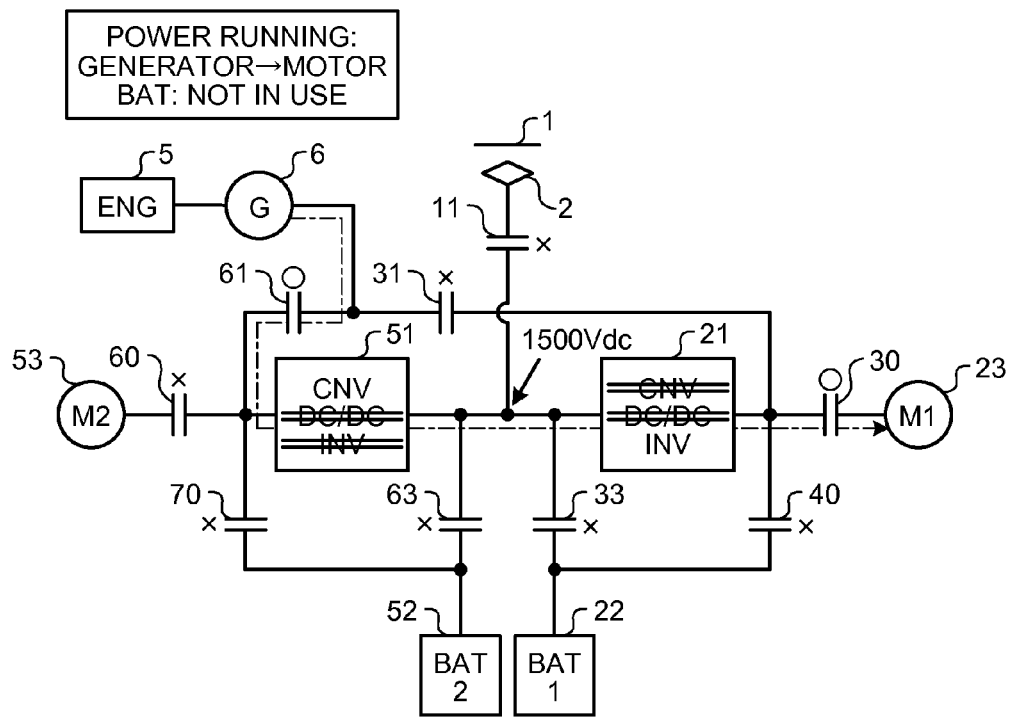
FIG. 4 is a diagram of an operation in which a first motor is driven using power generated by a generator.

FIG. 4 is a diagram of an operation in driving the first motor 23 using power generated by the generator 6. In such control, it is assumed that, for example, the first power storage device 22 or the second power storage device 52 is not used. As shown in the figure, when the first motor 23 is driven using the power generated by the generator 6, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 operates as the AC/DC converter (CNV). The first power converter 21 operates as the DC/AC converter (INV) to drive the first motor 23. Note that, in the control, the second power converter 51 is controlled such that the voltage of the direct-current common section changes to a high voltage (near 1500 Vdc) adjusted to the overhead wire voltage. That is, the voltage of the direct-current common section is controlled to different voltages during the start (departure) and during the power running of the vehicle.

(a-4: Power Running+Discharging)

Figure 5:
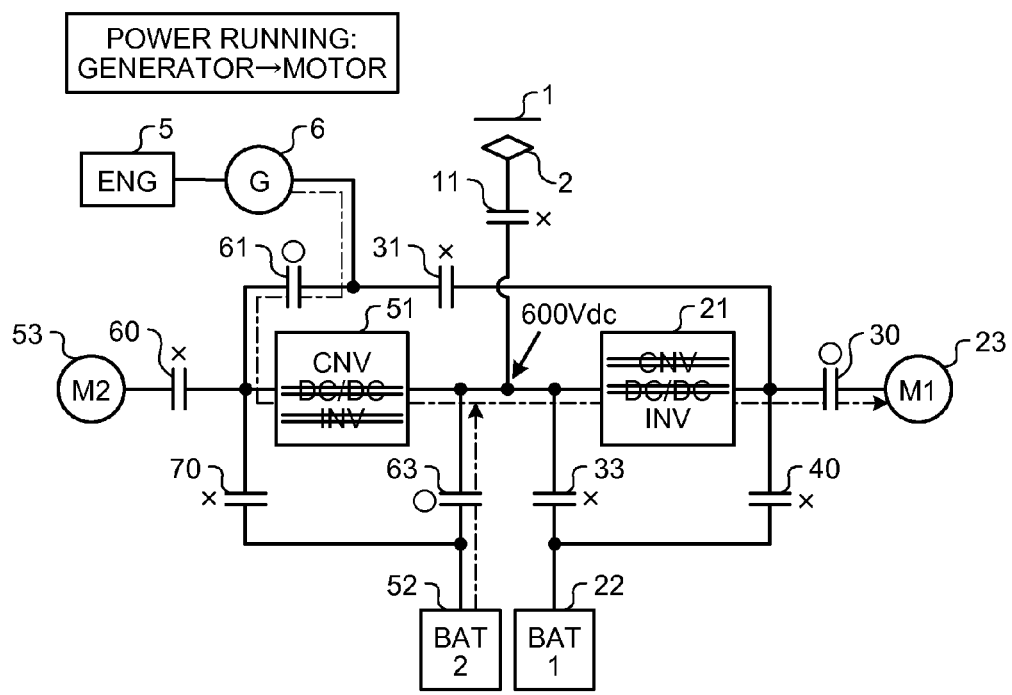
FIG. 5 is a diagram of an operation in which the first motor is driven using both of the power generated by the generator and stored power of the second power storage device.

FIG. 5 is a diagram of an operation in driving the first motor 23 using both of the power generated by the generator 6 and the stored power of the second power storage device 52. As shown in the figure, when the first motor 23 is driven using the power generated by the generator 6 and the stored power of the second power storage device 52, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 operates as the AC/DC converter (CNV). The first power converter 21 receives the direct-current powers from the second power converter 51 and the second power storage device 52 to operate as the DC/AC converter (INV) and drives the first motor 23. Note that, in the control, the second power converter 51 is controlled such that the voltage of the direct-current common section changes to 600 Vdc adjusted to the voltage (near 600 Vdc) of the second power storage device 52 or a voltage near 600 Vdc (hereinafter referred to as "low voltage").

(a-5: Power Running)

Figure 6:
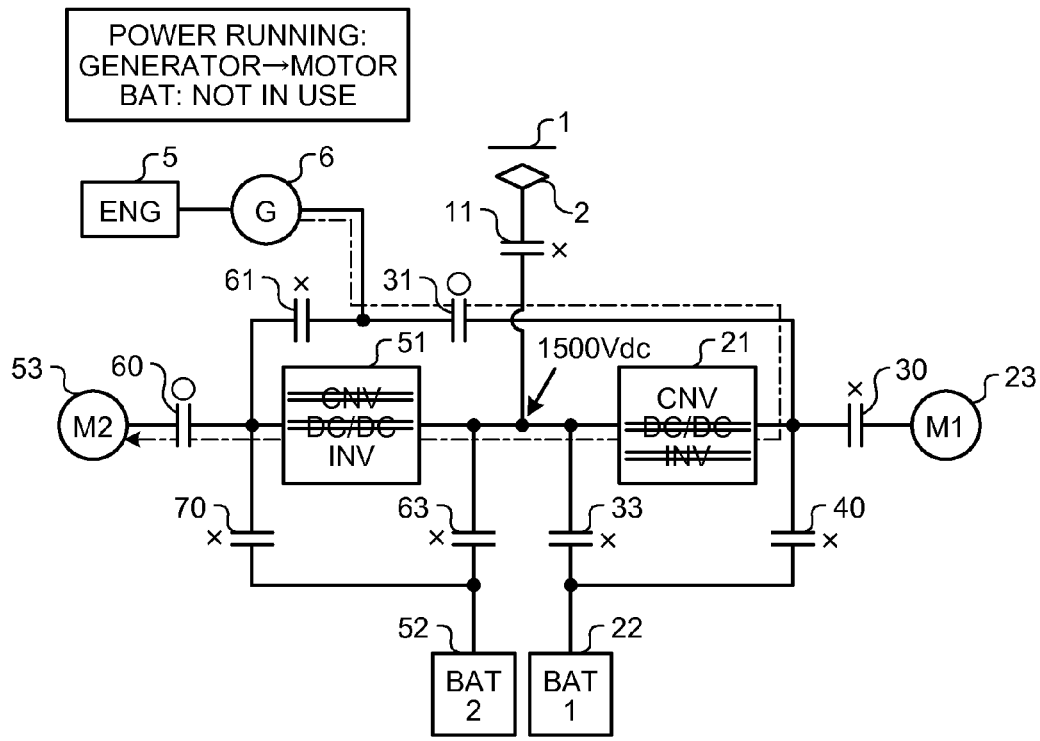
FIG. 6 is a diagram of an operation in which a second motor is driven using the power generated by the generator.

FIG. 6 is a diagram of an operation in driving the second motor 53 using power generated by the generator 6. In such control, it is assumed that, for example, the first power storage device 22 or the second power storage device 52 is not used. As shown in the figure, when the second motor 53 is driven using the power generated by the generator 6, the direct-current pantograph 2 is lowered, the first circuit breaker 11 is controlled so as to be turned off, the eighth contactor 61 is controlled so as to be turned off, the tenth contactor 31 is controlled so as to be turned on, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 operates as the AC/DC converter (CNV). The second power converter 51 operates as the DC/AC converter (INV) to drive the second motor 53. Note that, in the control, the first power converter 21 is controlled such that the voltage of the direct-current common section changes to a high voltage (near 1500 Vdc) adjusted to the overhead wire voltage. That is, the voltage of the direct-current common section is controlled to different voltages during the start (departure) and during the power running of the vehicle.

(a-6. Power Running+Discharging)

Figure 7:
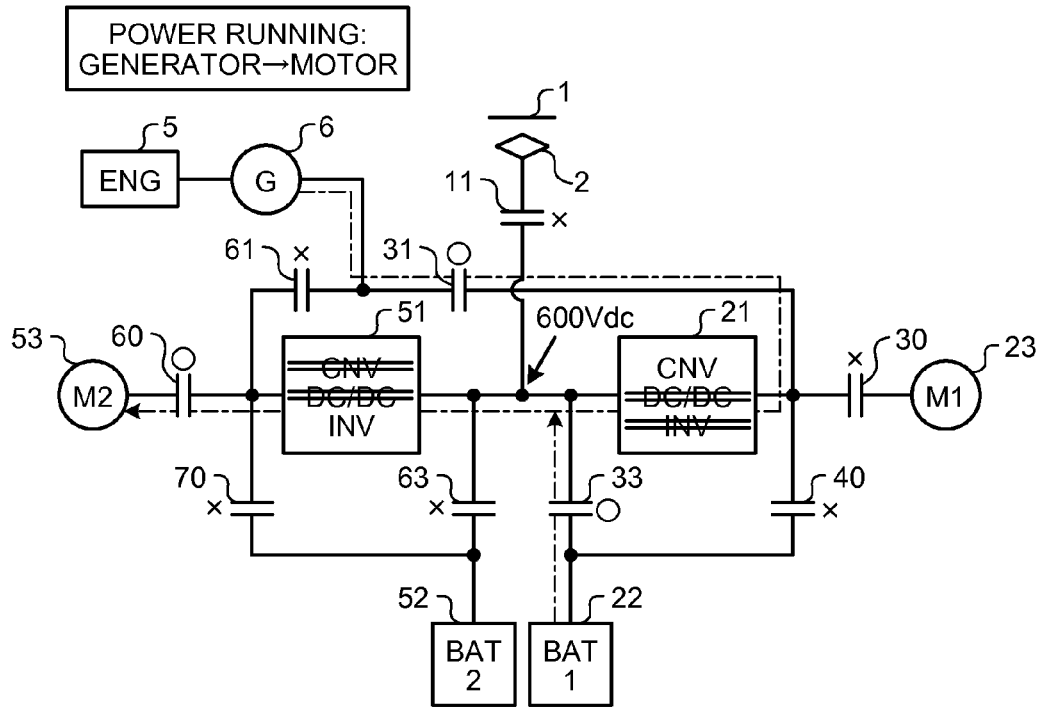
FIG. 7 is a diagram of an operation in which the second motor is driven using both of the power generated by the generator and stored power of a first power storage device.

FIG. 7 is a diagram of an operation in driving the second motor 53 using both of the power generated by the generator 6 and the stored power of the first power storage device 22. As shown in the figure, when the second motor 53 is driven using the power generated by the generator 6 and the stored power of the first power storage device 22, the direct-current pantograph 2 is lowered, the first circuit breaker 11 is controlled so as to be turned off, the eighth contactor 61 is controlled so as to be turned off, the tenth contactor 31 is controlled so as to be turned on, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 operates as the AC/DC converter (CNV). The second power converter 51 operates as the DC/AC converter (INV) and drives the second motor 53. Note that, in the control, the first power converter 21 is controlled such that the voltage of the direct-current common section changes to 600 Vdc adjusted to the voltage (near 600 Vdc) of the first power converter 21 or a low voltage near 600 Vdc.

(a-7: Power Running)

Figure 8:
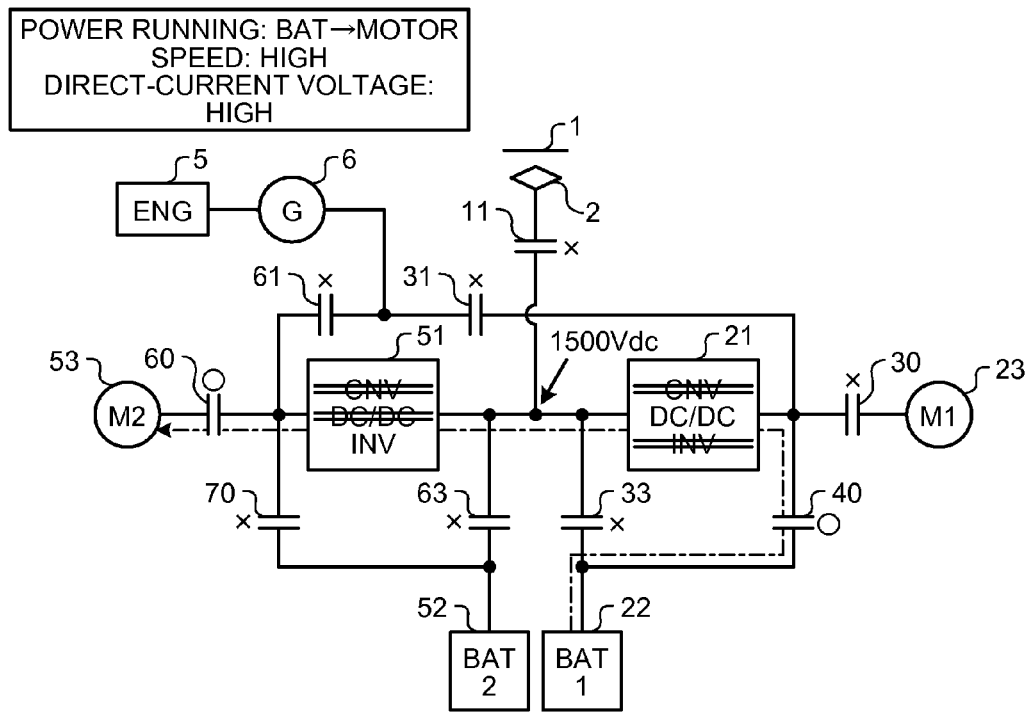
FIG. 8 is a diagram of an operation in which the second motor is driven using only the stored power of the first power storage device.

FIG. 8 is a diagram of an operation in which the second motor 53 is driven using only the stored power of the first power storage device 22. As shown in the figure, when the second motor 53 is driven using only the stored power of the first power storage device 22, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, the first power converter 21 operates as the DC/DC converter (DC/DC). The second power converter 51 operates as the DC/AC converter (INV) and drives the second motor 53. Note that, in the control, the first power converter 21 is controlled such that the voltage of the direct-current common section changes to the high voltage (near 1500 Vdc) adjusted to the overhead wire voltage. Therefore, it is possible to keep an input voltage to the second power converter 51 high and drive the vehicle at high speed.

(a-8: Power Running)

Figure 9:
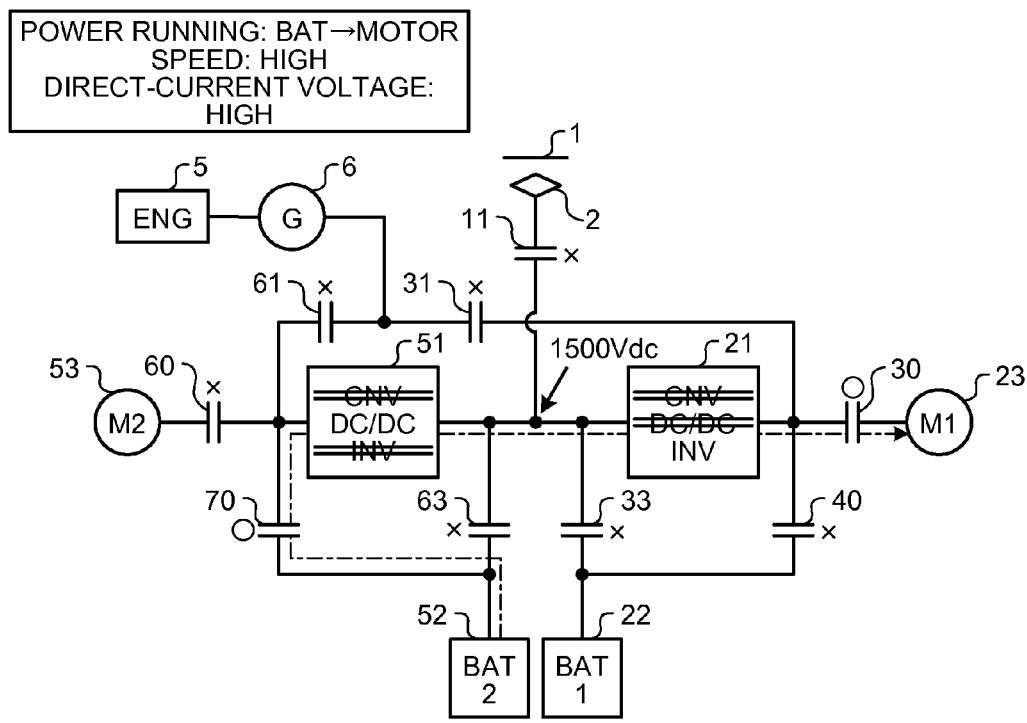
FIG. 9 is a diagram of an operation in which the first motor is driven using only the stored power of the second power storage device.

FIG. 9 is a diagram of an operation in which the first motor 23 is driven using only the stored power of the second power storage device 52. As shown in the figure, when the first motor 23 is driven using only the stored power of the second power storage device 52, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned on, the fourth contactor 63 is controlled so as to be turned off, the third contactor 33 is controlled so as to be turned off, and the second contactor 40 is controlled so as to be turned off. Under the control, the second power converter 51 operates as the DC/DC converter (DC/DC). The first power converter 21 operates as the DC/AC converter (INV) and drives the first motor 23. Note that, in the control, the second power converter 51 is controlled such that the voltage of the direct-current common section changes to the high voltage (near 1500 Vdc) adjusted to the overhead wire voltage. Therefore, it is possible to keep an input voltage to the first power converter 21 high and drive the vehicle at high speed.

(a-9: Power Running)

Figure 10:
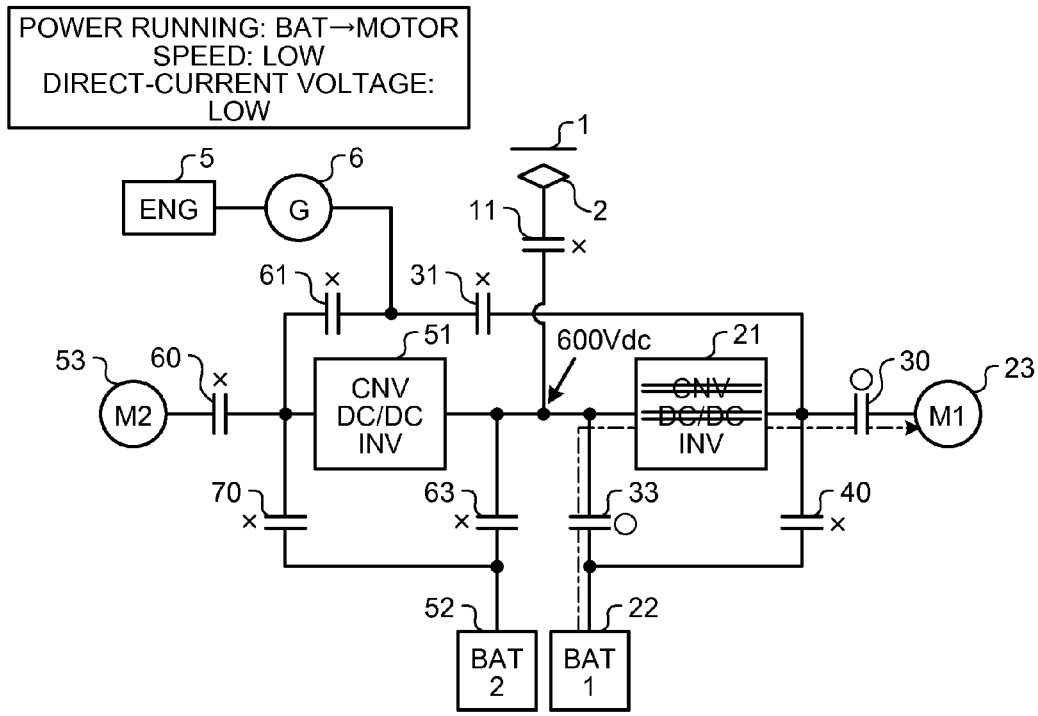
FIG. 10 is a diagram of an operation in which the first motor is driven using only the stored power of the first power storage device.

FIG. 10 is a diagram of an operation in which the first motor 23 is driven using only the stored power of the first power storage device 22. In such control, it is assumed that, for example, the second power converter 51 has broken down. As shown in the figure, when the first motor 23 is driven using only the stored power of the first power storage device 22, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 receives the direct-current power from the first power storage device 22 to operate as the DC/AC converter (INV) and drives the first motor 23. Note that, in the control, the voltage of the first power storage device 22 is directly applied to the direct-current common section. Therefore, the voltage of the direct-current common section changes to the low voltage (near 600 Vdc). Therefore, the operation of the first power converter 21 is limited and the vehicle is driven at low speed.

(a-10: Power Running)

Figure 11:
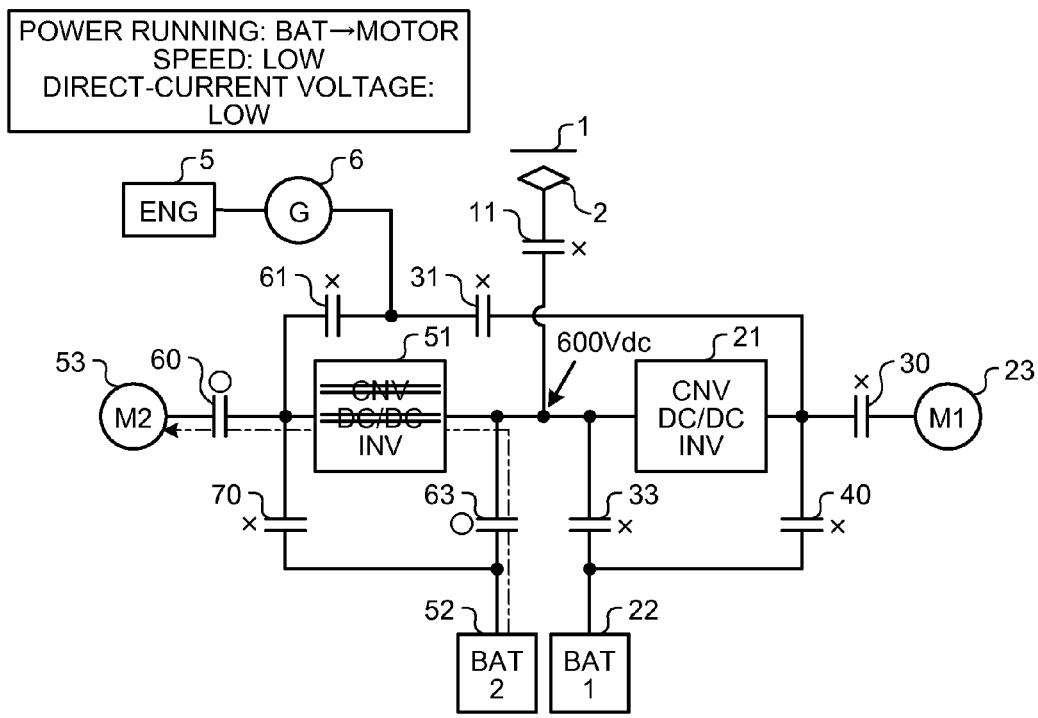
FIG. 11 is a diagram of an operation in which the second motor is driven using only the stored power of the second power storage device.

FIG. 11 is a diagram of an operation in which the second motor 53 is driven using only the stored power of the second power storage device 52. In such control, it is assumed that, for example, the first power converter 21 has broken down. As shown in the figure, when the second motor 53 is driven using only the stored power of the second power storage device 52, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 receives the direct-current power from the second power storage device 52 to operate as the DC/AC converter (INV) and drives the second motor 53. Note that, in the control, the voltage of the second power storage device 52 is directly applied to the direct-current common section. Therefore, the voltage of the direct-current common section changes to the low voltage (near 600 Vdc). Therefore, the operation of the second power converter 51 is limited and the vehicle is driven at low speed.

(a-11: Regeneration)

Figure 12:
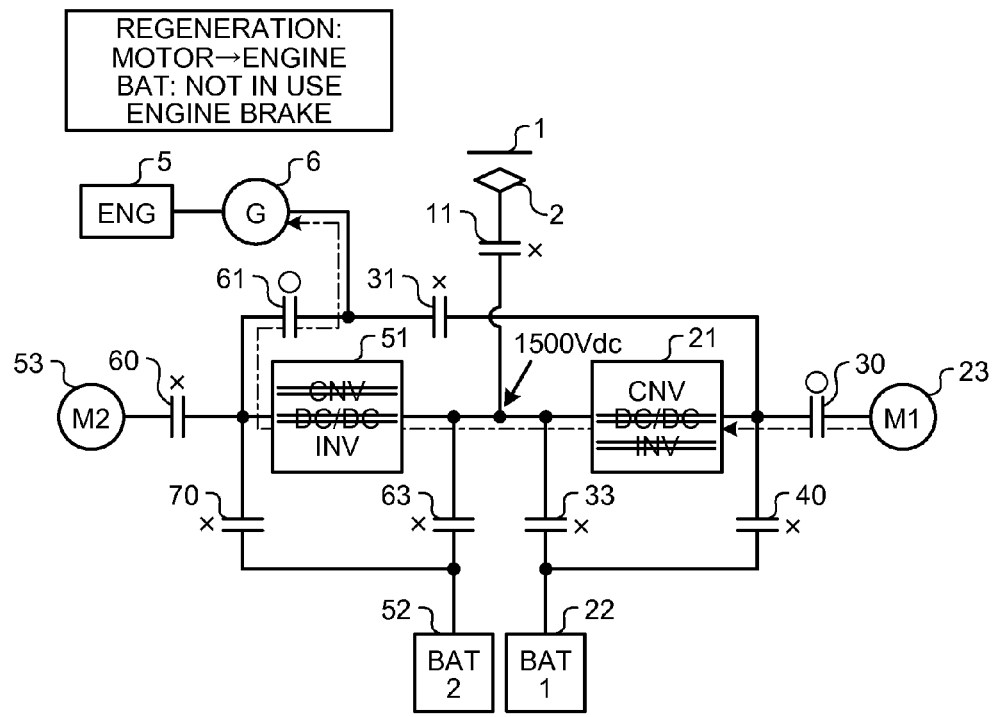
FIG. 12 is a diagram of an operation in which regenerative power of the first motor is used as an engine brake.

FIG. 12 is a diagram of an operation in which the regenerative power of the first motor 23 is used as the engine brake. As shown in the figure, when the regenerative power of the first motor 23 is used as the engine brake, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 receives the regenerative power of the first motor 23 to operate as the AC/DC converter (CNV). The second power converter 51 operates as the DC/AC converter (INV) and drives the generator 6 to thereby apply the engine brake. Note that, in the control, the first power storage device 22 and the second power storage device 52 are separated from the direct-current common section. Therefore, the voltage of the direct-current common section is controlled to the high voltage (near 1500 Vdc).

(a-12: Regeneration+Charging/Engine Brake)

Figure 13:
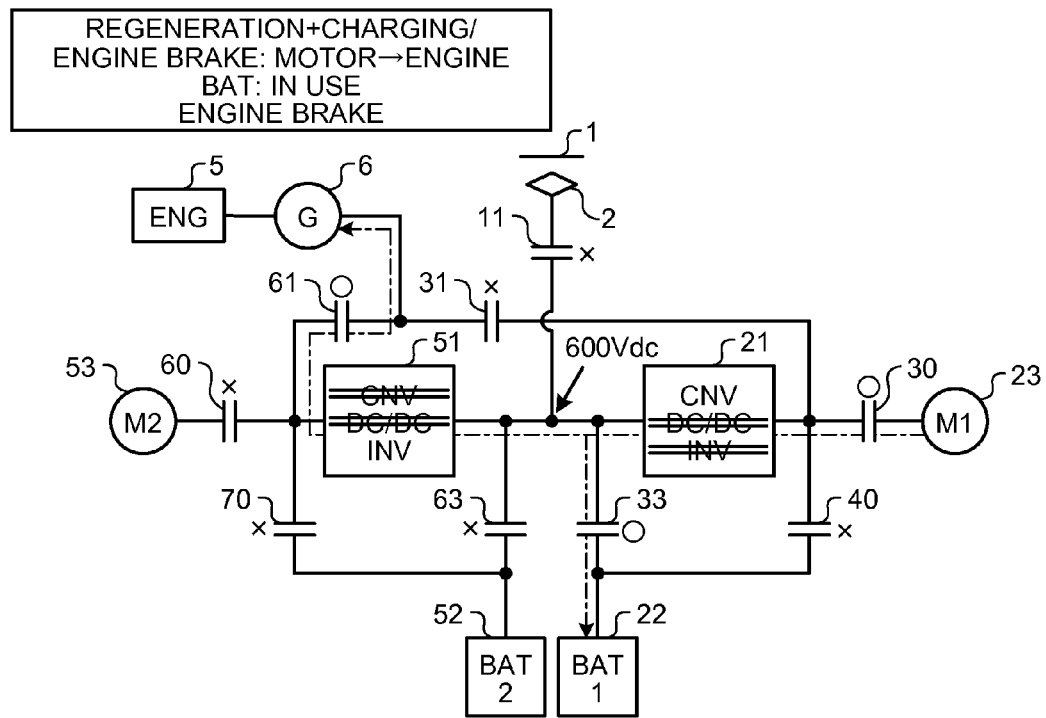
FIG. 13 is a diagram of an operation in which the regenerative power of the first motor is used as the engine brake and charged power.

FIG. 13 is a diagram of an operation in which the regenerative power of the first motor 23 is used as the engine brake and the charged power. As shown in the figure, when the regenerative power of the first motor 23 is used as the engine brake and the charged power, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 receives the regenerative power of the first motor 23 to operate as the AC/DC converter (CNV) and charges the second power storage device 52. The second power converter 51 operates as the DC/AC converter (INV), drives the generator 6 using the excess power supplied from the first power converter 21, and applies the engine brake. Note that, in the control, the first power storage device 22 is connected to the direct-current common section. Therefore, the voltage of the direct-current common section is controlled to the low voltage (near 600 Vdc).

(a-13: Regeneration)

Figure 14:
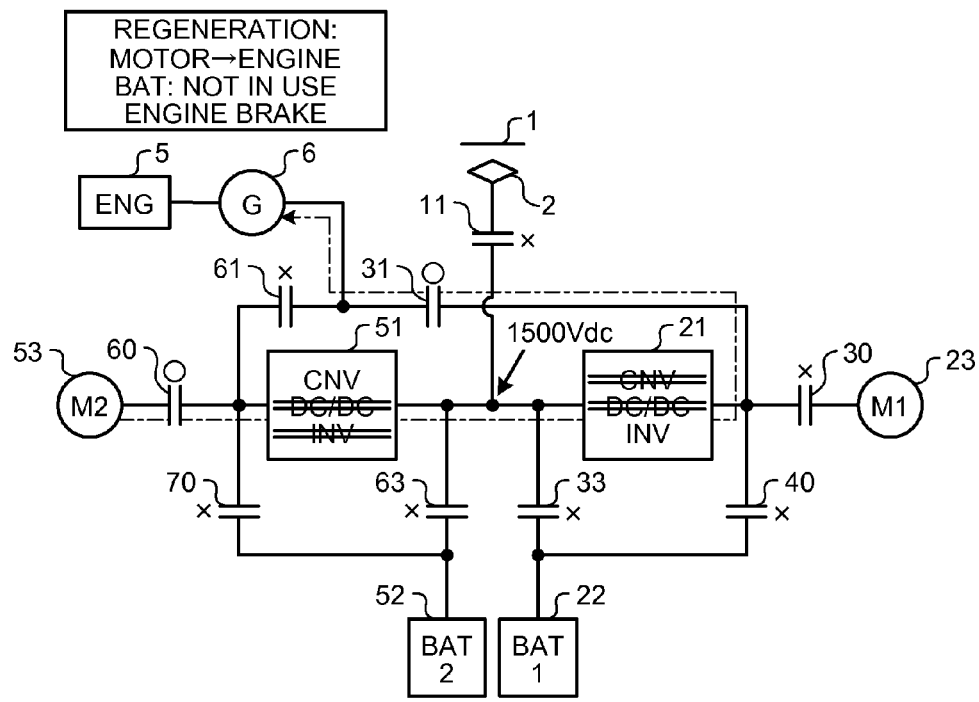
FIG. 14 is a diagram of an operation in which regenerative power of the second motor is used as the engine brake.

FIG. 14 is a diagram of an operation in which the regenerative power of the second motor 53 is used as the engine brake. As shown in the figure, when the regenerative power of the second motor 53 is used as the engine brake, the direct-current pantograph 2 is lowered, the first circuit breaker 11 is controlled so as to be turned off, the eighth contactor 61 is controlled so as to be turned off, the tenth contactor 31 is controlled so as to be turned on, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 receives the regenerative power of the second motor 53 to operate as the AC/DC converter (CNV). The first power converter 21 operates as the DC/AC converter (INV) and drives the generator 6 to thereby apply the engine brake. Note that, in the control, the first power storage device 22 and the second power storage device 52 are separated from the direct-current common section. Therefore, the voltage of the direct-current common section is controlled to the high voltage (near 1500 Vdc).

(a-14: Regeneration+Charging/Engine Brake)

Figure 15:
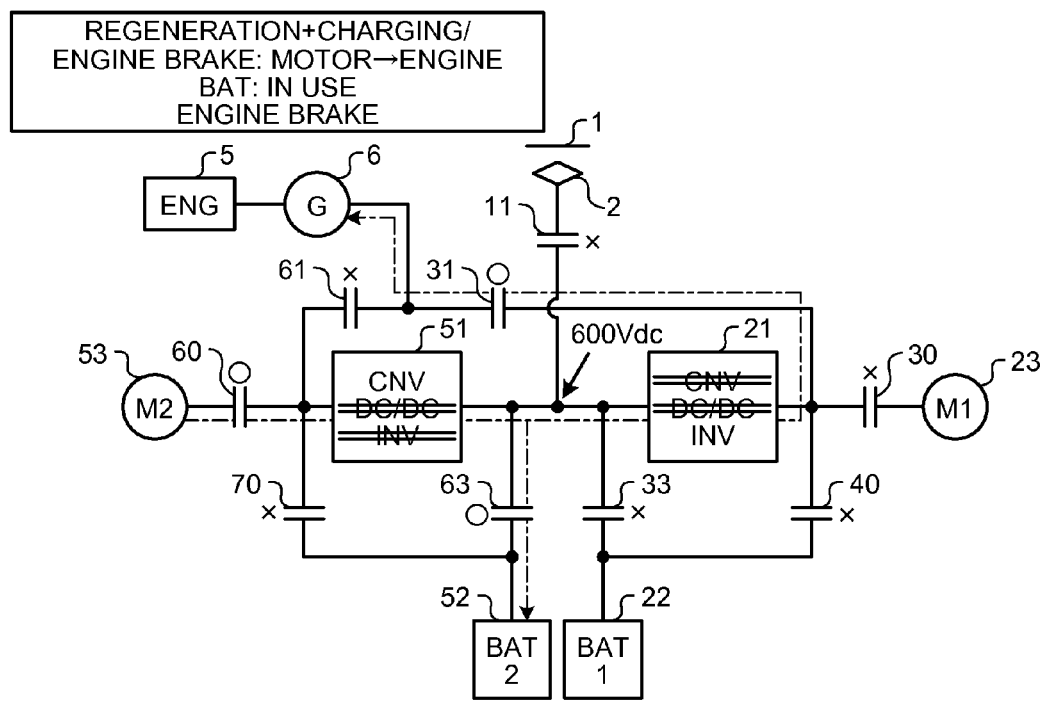
FIG. 15 is a diagram of an operation in which the regenerative power of the second motor is used as the engine brake and the charged power.

FIG. 15 is a diagram of an operation in which the regenerative power of the second motor 53 is used as the engine brake and the charged power. As shown in the figure, when the regenerative power of the second motor 53 is used as the engine brake and the charged power, the direct-current pantograph 2 is lowered, the first circuit breaker 11 is controlled so as to be turned off, the eighth contactor 61 is controlled so as to be turned off, the tenth contactor 31 is controlled so as to be turned on, the fifth contactor 60 is controlled so as to be turned on, the first contactor 30 is controlled so as to be turned off, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 receives the regenerative power of the second motor 53 to operate as the AC/DC converter (CNV) and charges the second power storage device 52. The first power converter 21 operates as the DC/AC converter (INV), drives the generator 6 using the excess power supplied from the second power converter 51, and applies the engine brake. Note that, in the control, the second power storage device 52 is connected to the direct-current common section. Therefore, the voltage of the direct-current common section is controlled to the low voltage (near 600 Vdc).

(a-15: Regeneration+Charging)

Figure 16:
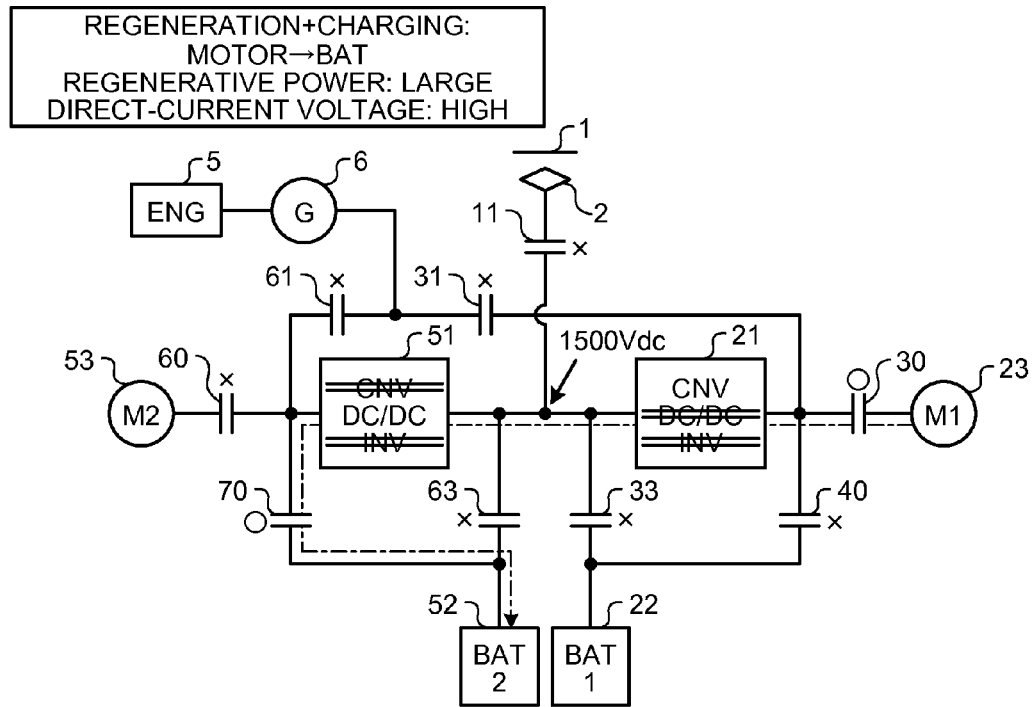
FIG. 16 is a diagram of an operation in which all the regenerative power of the first motor is used as the charged power.

FIG. 16 is a diagram of an operation in which all the regenerative power of the first motor 23 is used as the charged power. As shown in the figure, when all the regenerative power of the first motor 23 is used as the charged power, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned on, the fourth contactor 63 is controlled so as to be turned off, the third contactor 33 is controlled so as to be turned off, and the second contactor 40 is controlled so as to be turned off. Under the control, the first power converter 21 receives the regenerative power of the first motor 23 to operate as the AC/DC converter (CNV). The second power converter 51 operates as the DC/DC converter (DC/DC) and charges the second power storage device 52. Note that, in the control, to efficiently charge the regenerative power in the second power storage device 52, the voltage of the direct-current common section is controlled to the high voltage (near 1500 Vdc).

(a-16: Regeneration+Charging)

Figure 17:
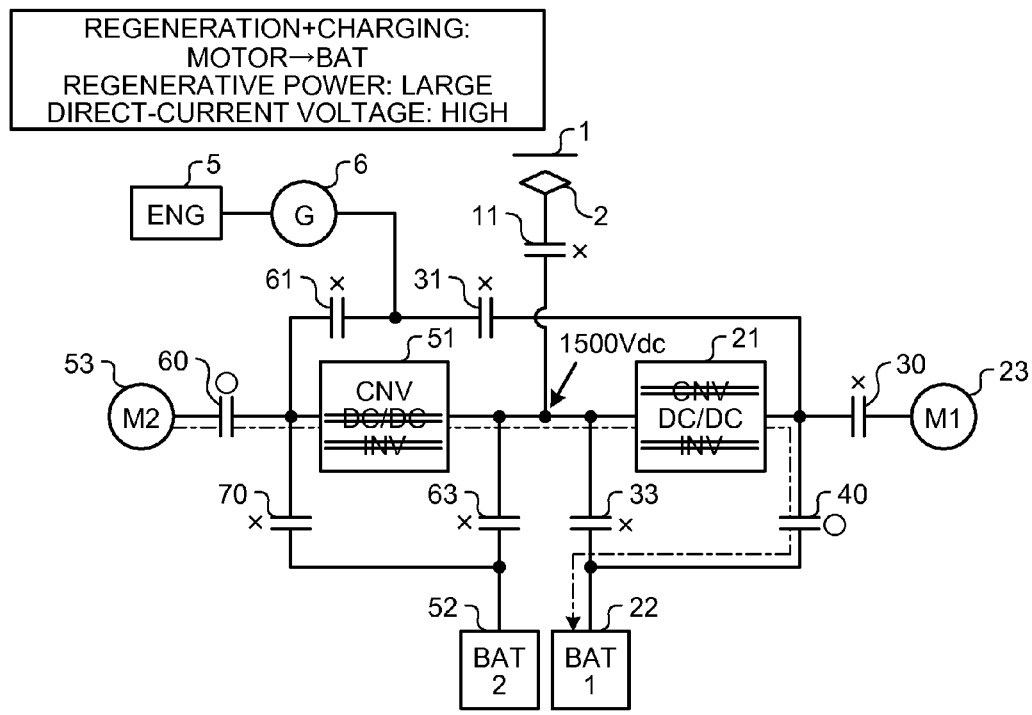
FIG. 17 is a diagram of an operation in which all the regenerative power of the second motor is used as the charged power.

FIG. 17 is a diagram of an operation in which all the regenerative power of the second motor 53 is used as the charged power. As shown in the figure, when all the regenerative power of the second motor 53 is used as the charged power, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, the second power converter 51 receives the regenerative power of the second motor 53 to operate as the AC/DC converter (CNV). The first power converter 21 operates as the DC/DC converter (DC/DC) and charges the first power storage device 22. Note that, in the control, to efficiently charge the regenerative power in the first power storage device 22, the voltage of the direct-current common section is controlled to the high voltage (near 1500 Vdc).

(a-17: Regeneration+Charging)

Figure 18:
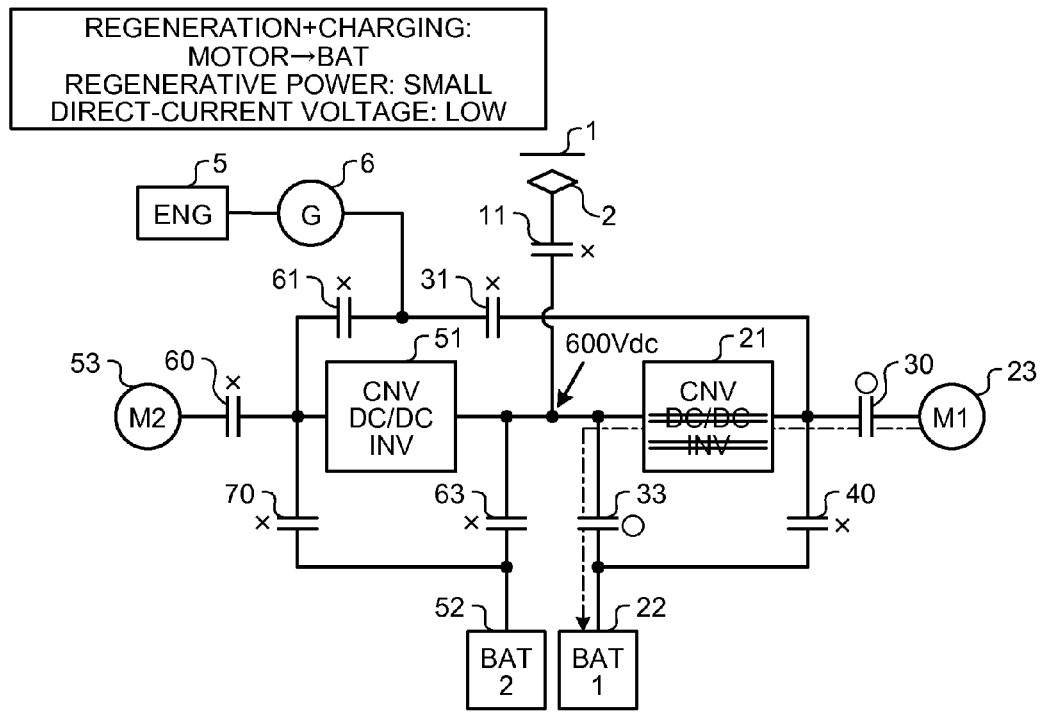
FIG. 18 is a diagram of an operation different from FIG. 16 in which all the regenerative power of the first motor is used as the charged power.

FIG. 18 is a diagram of an operation different from FIG. 16 in which all the regenerative power of the first motor 23 is used as the charged power. When all the regenerative power of the first motor 23 is used as the charged power, control can be performed as shown in FIG. 18 differently from FIG. 16. In such control, it is assumed that, for example, the second power converter 51 has broken down. In the case of FIG. 18, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 receives the regenerative power from the first motor 23 to operate as the AC/DC converter (CNV) and charges the first power storage device 22. Note that, in the control, the voltage of the first power storage device 22 is directly applied to the direct-current common section. Therefore, the voltage of the direct-current common section changes to the low voltage (near 600 Vdc). Therefore, the regenerative power served for the charged power is made small compared with the regenerative power in FIG. 16.

(a-18: Regeneration+Charging)

Figure 19:
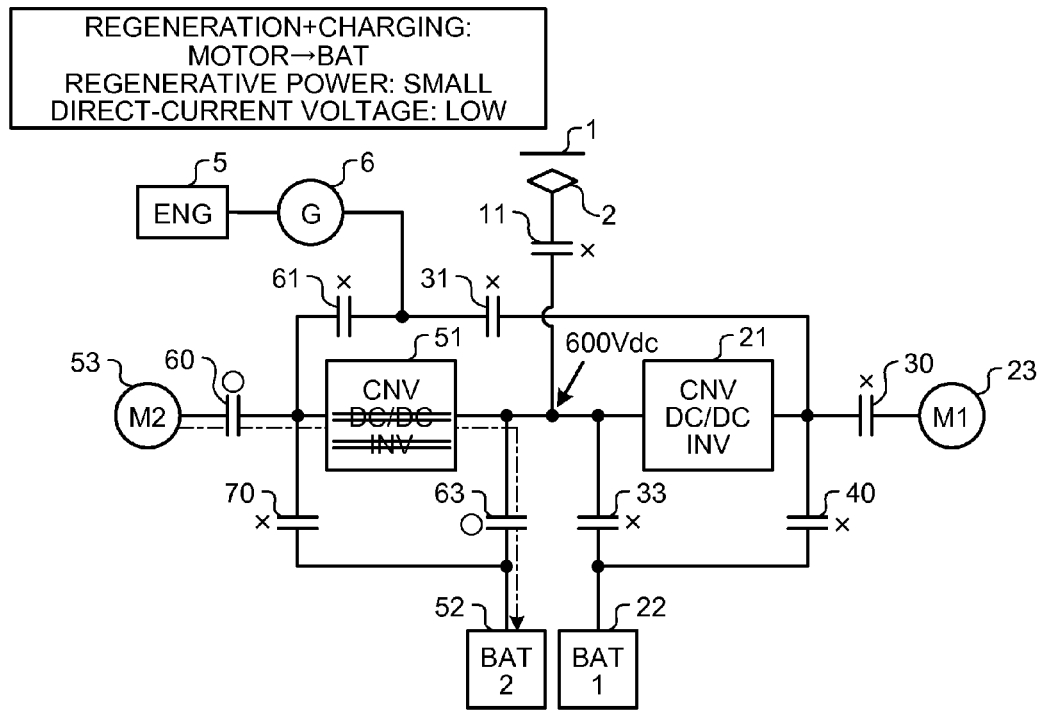
FIG. 19 is a diagram of an operation different from FIG. 17 in which all the regenerative power of the second motor is used as the charged power.

FIG. 19 is a diagram of an operation different from FIG. 17 in which all the regenerative power of the second motor 53 is used as the charged power. When all the regenerative power of the second motor 53 is used as the charged power, control can be performed as shown in FIG. 19 differently from FIG. 17. In such control, it is assumed that, for example, the first power converter 21 has broken down. In the case of FIG. 19, the direct-current pantograph 2 is lowered, the first circuit breaker 11 is controlled so as to be turned off, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 receives the regenerative power from the second motor 53 to operate as the AC/DC converter (CNV) and charges the second power storage device 52. Note that, in the control, the voltage of the second power storage device 52 is directly applied to the direct-current common section. Therefore, the voltage of the direct-current common section changes to the low voltage (near 600 Vdc). Therefore, the regenerative power served for the charged power is made small compared with the regenerative power in FIG. 17.

(a-19: Mode: Generated Charging)

Figure 20:
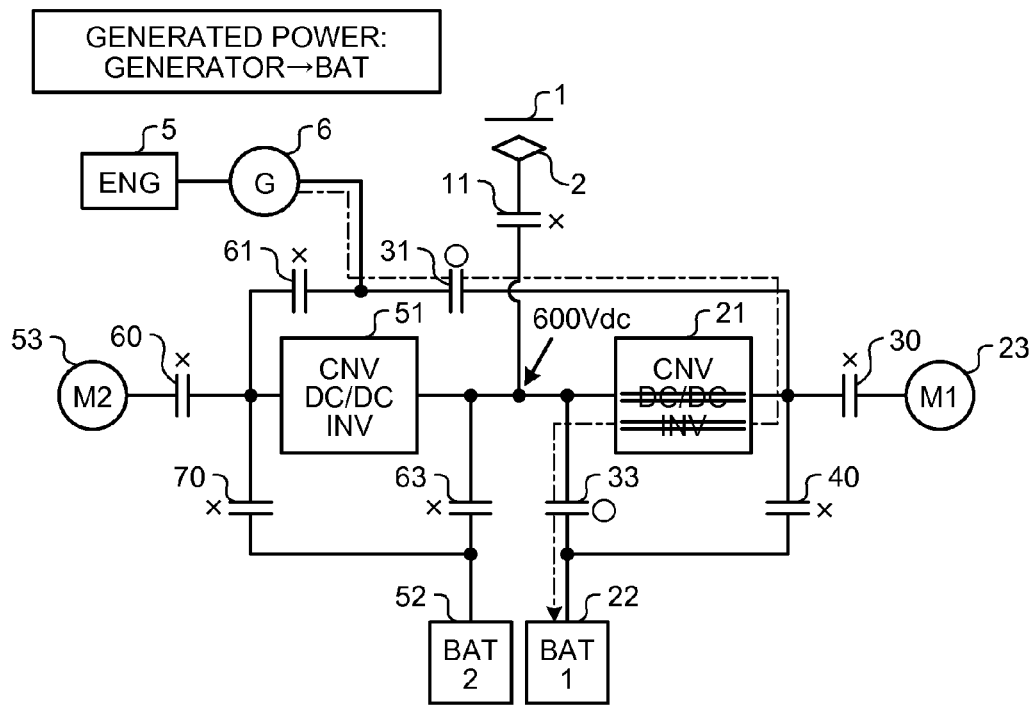
FIG. 20 is a diagram of an operation in charging the first power storage device using the power generated by the generator.

FIG. 20 is a diagram of an operation in charging the first power storage device 22 using the power generated by the generator 6. As shown in the figure, when the first power storage device 22 is charged using the power generated by the generator 6, the direct-current pantograph 2 is lowered, the first circuit breaker 11 is controlled so as to be turned off, the eighth contactor 61 is controlled so as to be turned off, the tenth contactor 31 is controlled so as to be turned on, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned on, and the second contactor 40 is controlled so as to be turned off. Under the control, the first power converter 21 operates as the AC/DC converter (CNV) to charge the first power storage device 22. Note that, in the control, the first power storage device 22 is connected to the direct-current common section. Therefore, the voltage of the direct-current common section is controlled to the low voltage (near 600 Vdc).

(a-20, Mode: Generated Charging)

Figure 21:
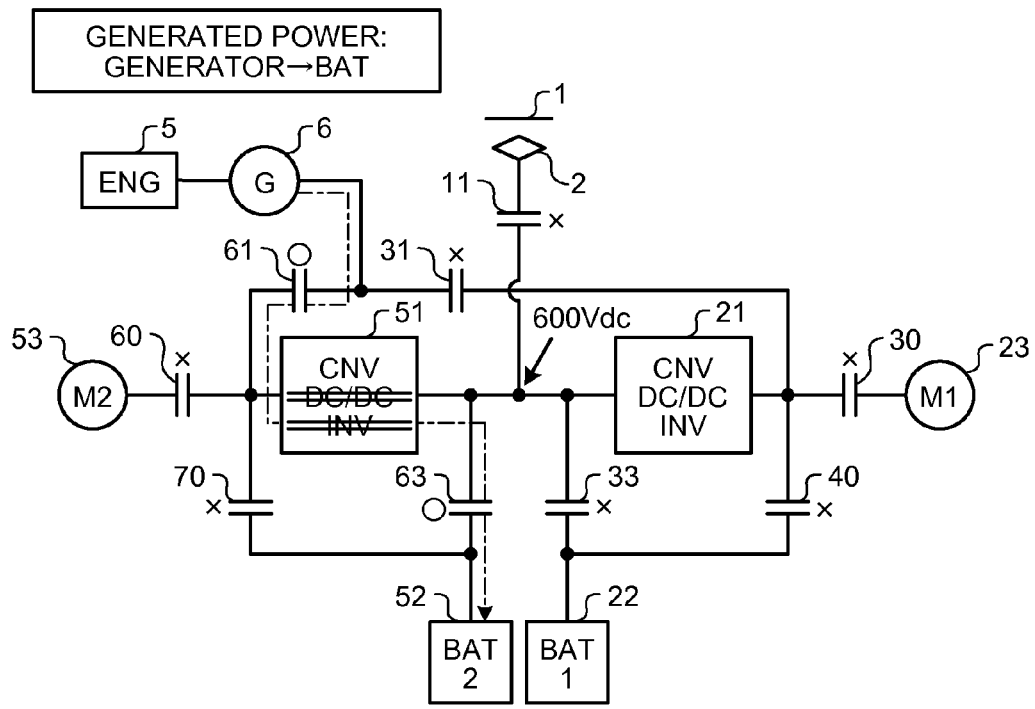
FIG. 21 is a diagram of an operation in charging the second power storage device using the power generated by the generator.

FIG. 21 is a diagram of an operation in charging the second power storage device 52 using the power generated by the generator 6. As shown in the figure, when the second power storage device 52 is charged using the power generated by the generator 6, the direct-current pantograph 2 is lowered, the first circuit breaker 11 is controlled so as to be turned off, the eighth contactor 61 is controlled so as to be turned on, the tenth contactor 31 is controlled so as to be turned off, the fifth contactor 60 is controlled so as to be turned off, the first contactor 30 is controlled so as to be turned off, the sixth contactor 70 is controlled so as to be turned off, the fourth contactor 63 is controlled so as to be turned on, the third contactor 33 is controlled so as to be turned off, and the second contactor 40 is controlled so as to be turned off. Under the control, the second power converter 51 operates as the AC/DC converter (CNV) to charge the second power storage device 52. Note that, in the control, the second power storage device 52 is connected to the direct-current common section. Therefore, the voltage of the direct-current common section is controlled to the low voltage (near 600 Vdc).

FIG. 22 is a diagram of a list in a table format of the operations shown in FIG. 2 to FIG. 21. Not only operation states or control states of the sections shown in the figures but also control states of the sections shown in FIG. 1 are shown. "INV", "CNV", and "DC/DC" shown in columns of first and second power converters represent operation states of the first and second power converters. "x" means that the first and second power converters are not used. "OFF" shown in a column of a pantograph means that the direct-current pantograph 2 is lowered. A "circle" mark shown in columns of first to tenth contactors, first to third circuit breakers, and first to fourth line breakers means a conduction state and "x" in the columns means a non-conduction state.

The above explanation is the explanation of the operation performed when the electric power of the direct-current overhead wire 1 is not used. Operations performed when the electric power of the direct-current overhead wire is used are explained below.

(b-1: Start)

Figure 23:
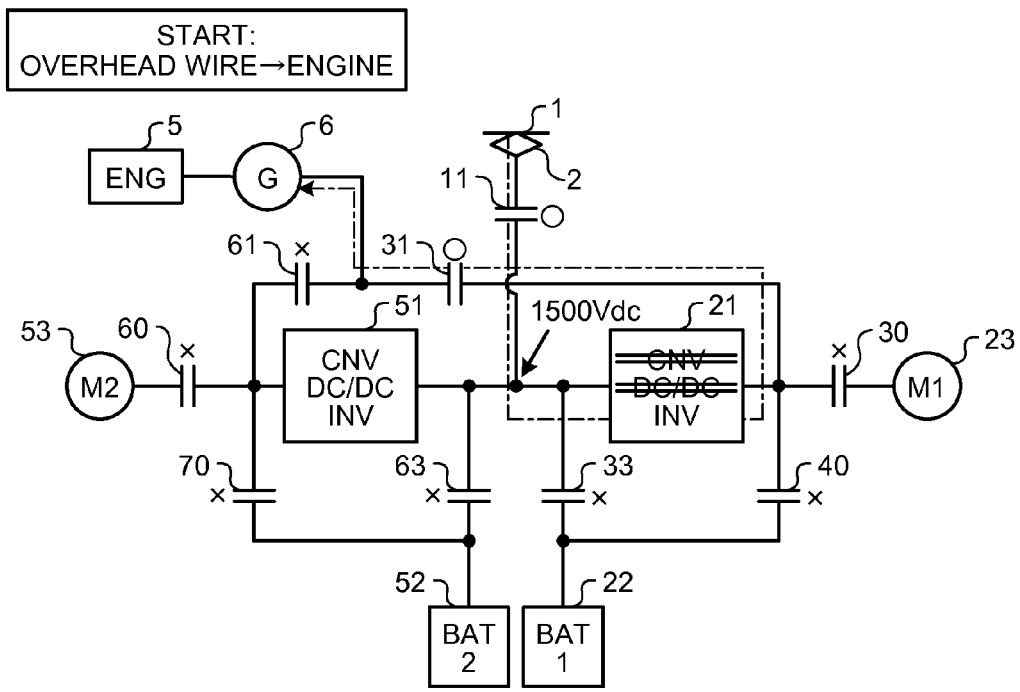
FIG. 23 is a diagram of an operation in which the engine start is performed using electric power of a direct-current overhead wire.

FIG. 23 is a diagram of an operation in which the engine start is performed using the electric power of the direct-current overhead wire 1. As shown in the figure, when the engine start is performed using the electric power of the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned on, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 operates as the DC/AC converter (INV), converts a high direct-current voltage applied from the direct-current overhead wire 1 into a three-phase alternating-current voltage to drive the generator 6 as the motor, and starts the engine 5 connected to the generator 6.

(b-2: Start)

Figure 24:
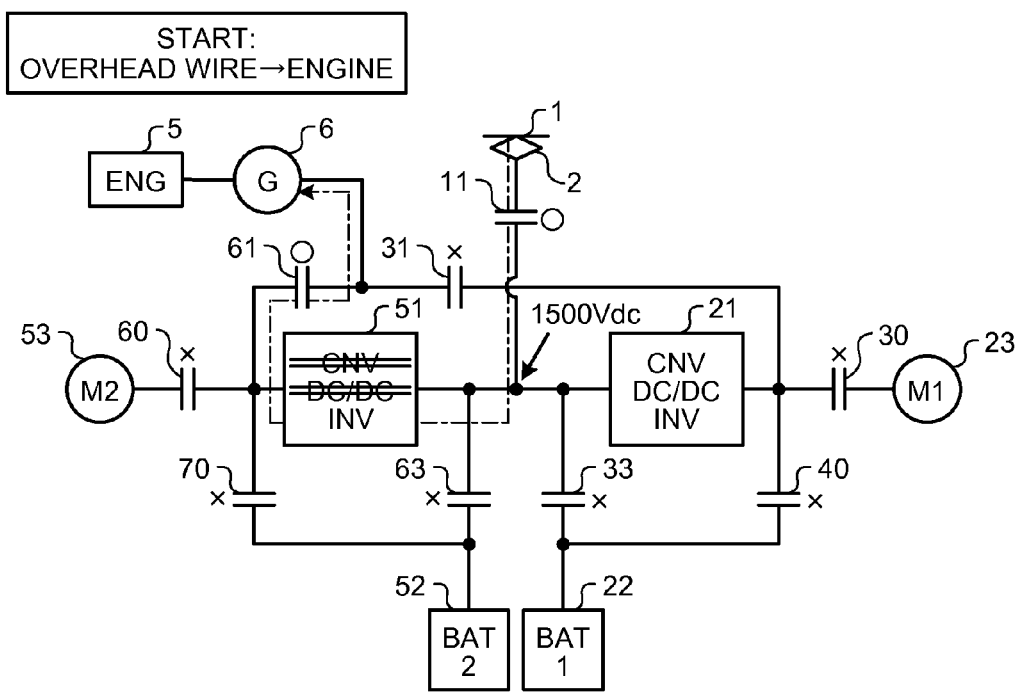
FIG. 24 is a diagram of another operation in which the engine start is performed using the electric power of the direct-current overhead wire.

FIG. 24 is a diagram of another operation in which the engine start is performed using the electric power of the direct-current overhead wire 1. As shown in the figure, when the engine start is performed using the electric power of the direct-current overhead wire 1, the direct-current pantograph 2 is lifted, the first circuit breaker 11 is controlled so as to be turned on, the eighth contactor 61 is controlled so as to be turned on, the tenth contactor 31 is controlled so as to be turned off, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 operates as the DC/AC converter (INV), converts a high direct-current voltage applied from the direct-current overhead wire 1 into a three-phase alternating-current voltage to drive the generator 6 as the motor, and starts the engine 5 connected to the generator 6.

(b-3: Power Regeneration)

Figure 25:
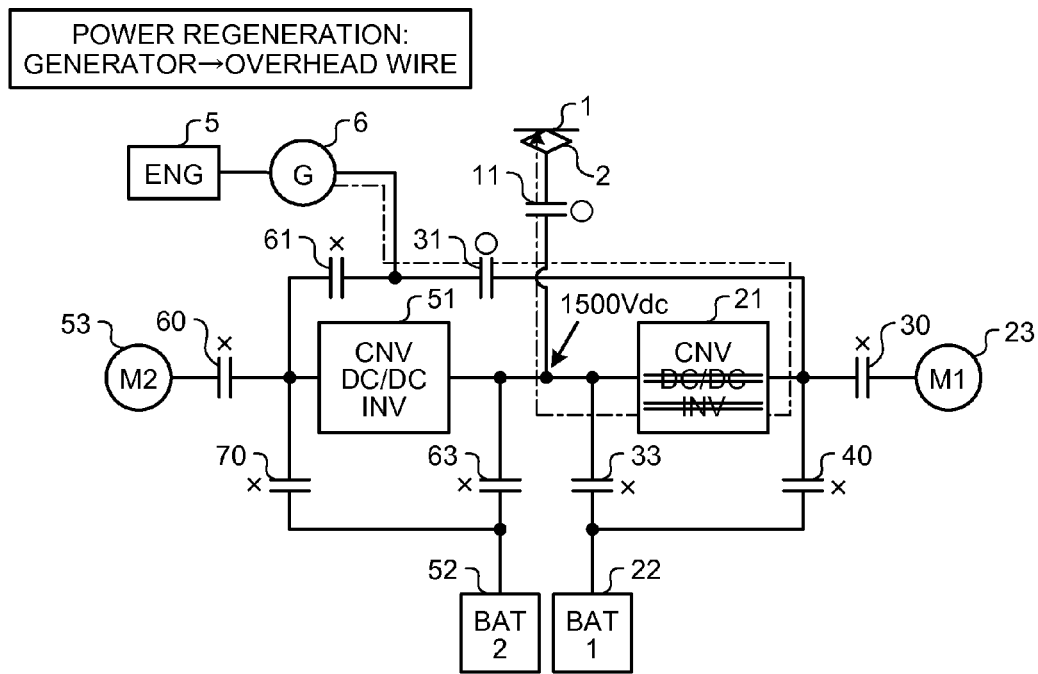
FIG. 25 is a diagram of an operation in regenerating (supplying) the power generated by the generator to the direct-current overhead wire.

FIG. 25 is a diagram of an operation in regenerating (supplying) the power generated by the generator 6 to the direct-current overhead wire 1. As shown in the figure, when the power generated by the generator 6 is regenerated to the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned on, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 operates as the AC/DC converter (CNV) to supply the generated power to the direct-current overhead wire 1. Note that, in the control, the output voltage of the first power converter 21 is controlled so as to be the high voltage (near 1500 Vdc) adjusted to the overhead wire voltage.

(b-4: Power Regeneration)

Figure 26:
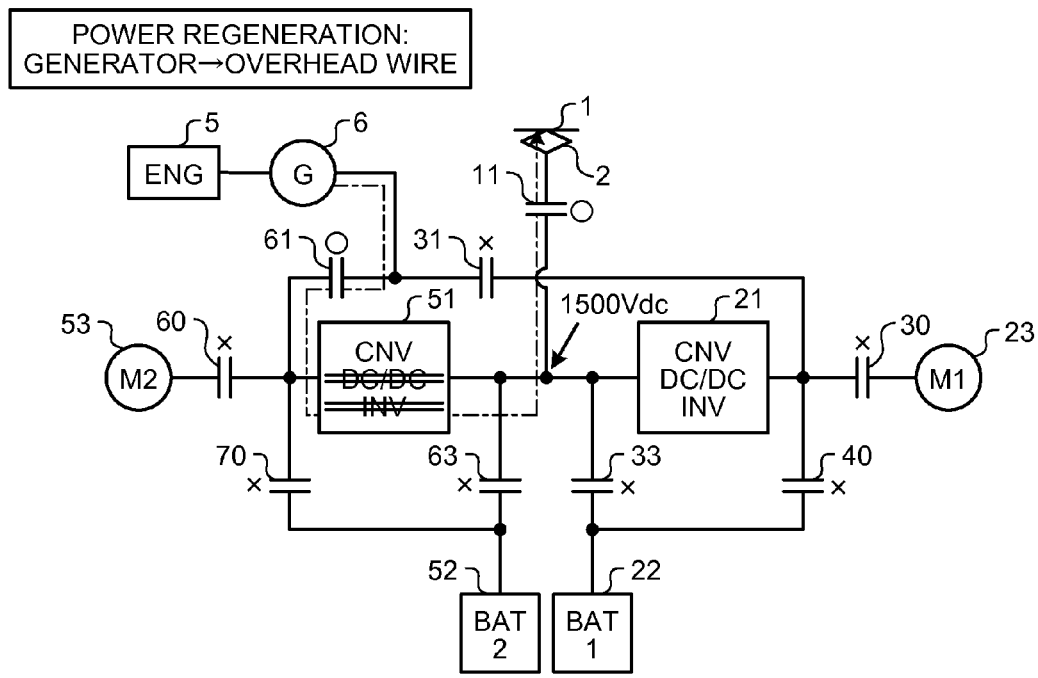
FIG. 26 is a diagram of another operation in regenerating (supplying) the power generated by the generator to the direct-current overhead wire.

FIG. 26 is a diagram of another operation in regenerating (supplying) the power generated by the generator 6 to the direct-current overhead wire 1. As shown in the figure, when the power generated by the generator 6 is regenerated to the direct-current overhead wire 1, the direct-current pantograph 2 is lifted, the first circuit breaker 11 is controlled so as to be turned on, the eighth contactor 61 is controlled so as to be turned on, the tenth contactor 31 is controlled so as to be turned off, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 operates as the AC/DC converter (CNV) to supply the generated power to the direct-current overhead wire 1. Note that, in the control, the output voltage of the second power converter 51 is controlled so as to be the high voltage (near 1500 Vdc) adjusted to the overhead wire voltage.

(b-5: Power Running)

Figure 27:
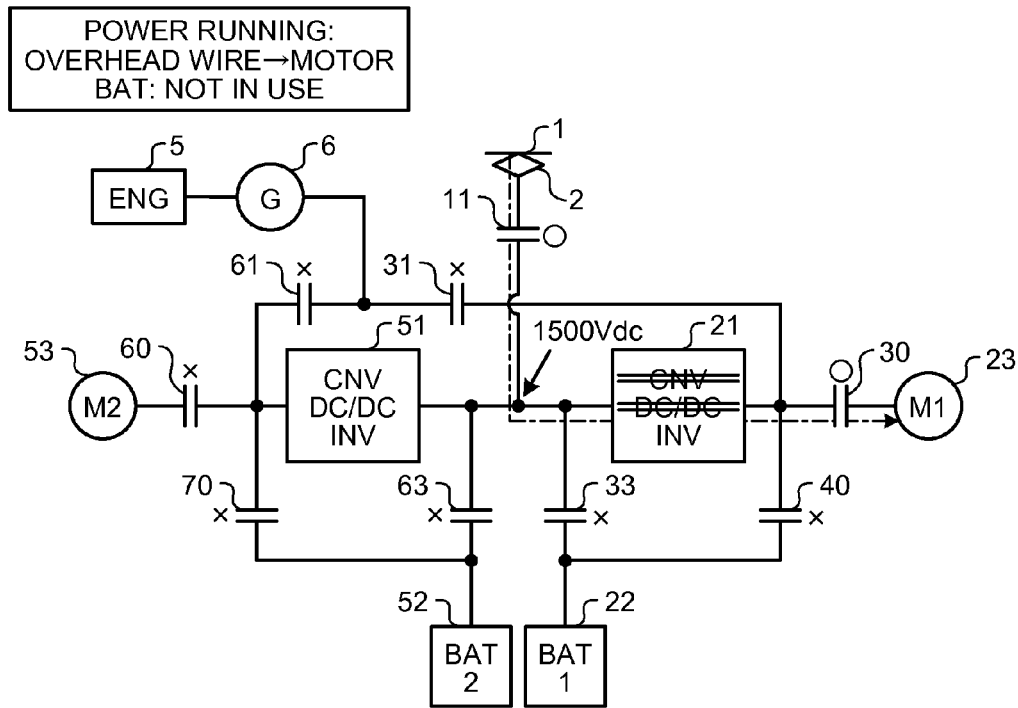
FIG. 27 is a diagram of an operation in which the first motor is driven using the electric power of the direct-current overhead wire.

FIG. 27 is a diagram of an operation in which the first motor 23 is driven using the electric power of the direct-current overhead wire 1. As shown in the figure, when the first motor 23 is driven using the electric power of the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 operates as the DC/AC converter (INV) and drives the first motor 23.

(b-6: Power Running)

Figure 28:
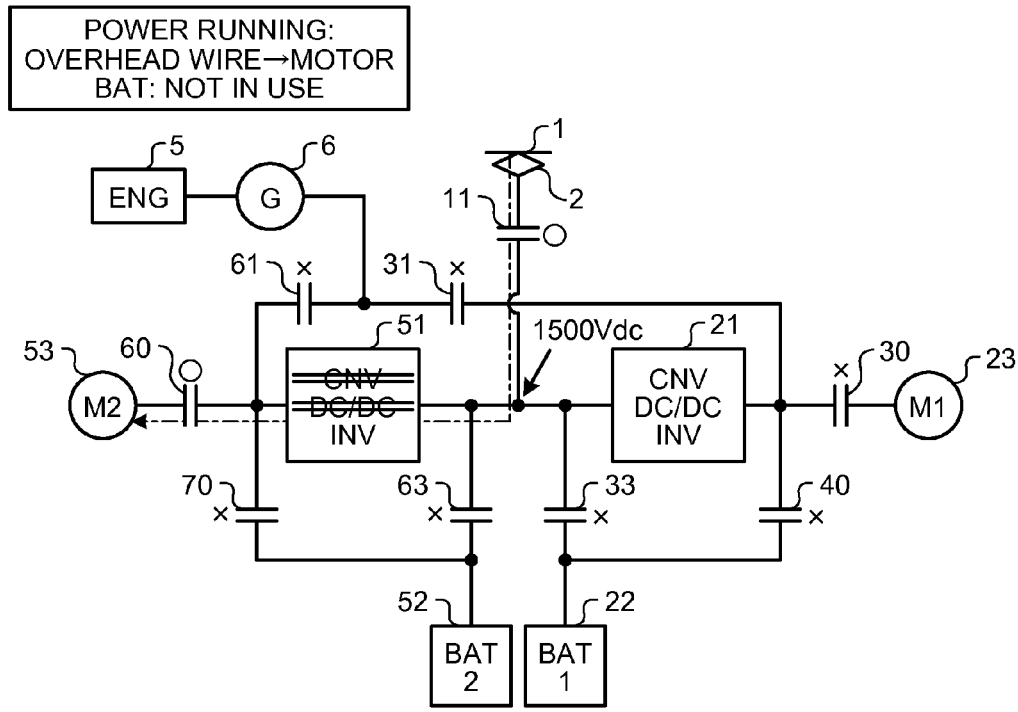
FIG. 28 is a diagram of an operation in which the second motor is driven using electric power of a direct-current overhead wire 1.

FIG. 28 is a diagram of an operation in which the second motor 53 is driven using the electric power of the direct-current overhead wire 1. As shown in the figure, when the second motor 53 is driven using the electric power of the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 operates as the DC/AC converter (INV) and drives the second motor 53.

(b-7: Power Running+Power Generation)

Figure 29:
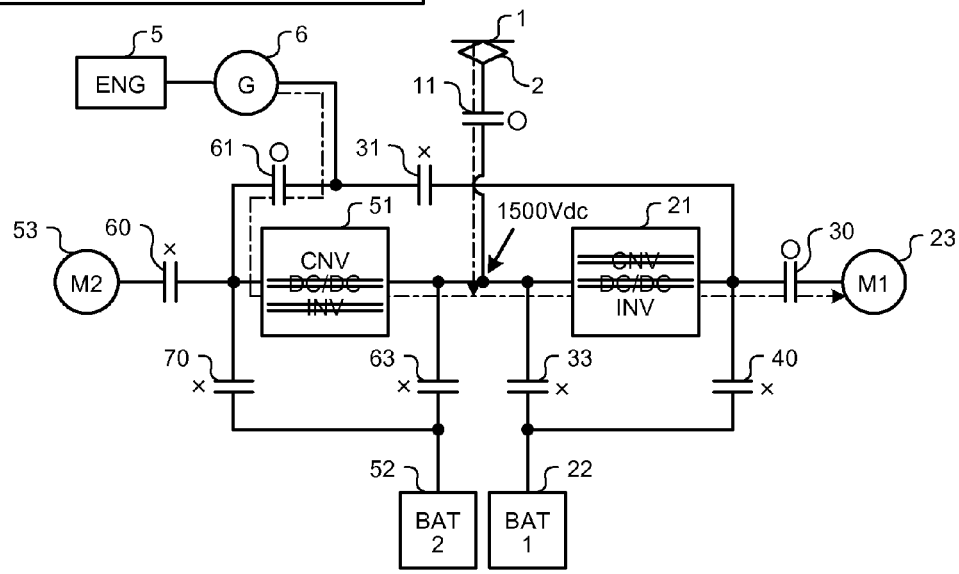
FIG. 29 is a diagram of an operation in which the first motor is driven using both of the electric power of the overhead wire 1 and the power generated by the generator.

FIG. 29 is a diagram of an operation in which the first motor 23 is driven using both of the electric power of the direct-current overhead wire 1 and the power generated by the generator 6. In such control, it is assumed that, for example, the SOCs of the first power storage device 22 and the second power storage device 52 are low. As shown in the figure, when the first motor 23 is driven using the electric power of the direct-current overhead wire 1 and the power generated by the generator 6, the direct-current pantograph 2 is lifted, the first circuit breaker 11 is controlled so as to be turned on, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 operates as the AC/DC converter (CNV). The first power converter 21 receives both of the electric power of the second power converter 51 and the overhead wire power to operate as the DC/AC converter (INV) and drives the first motor 23. Note that, in the control, the second power converter 51 is controlled such that the voltage of the direct-current common section changes to the high voltage (near 1500 Vdc) adjusted to the overhead wire voltage.

(b-8: Power Running+Power Generation)

Figure 30:
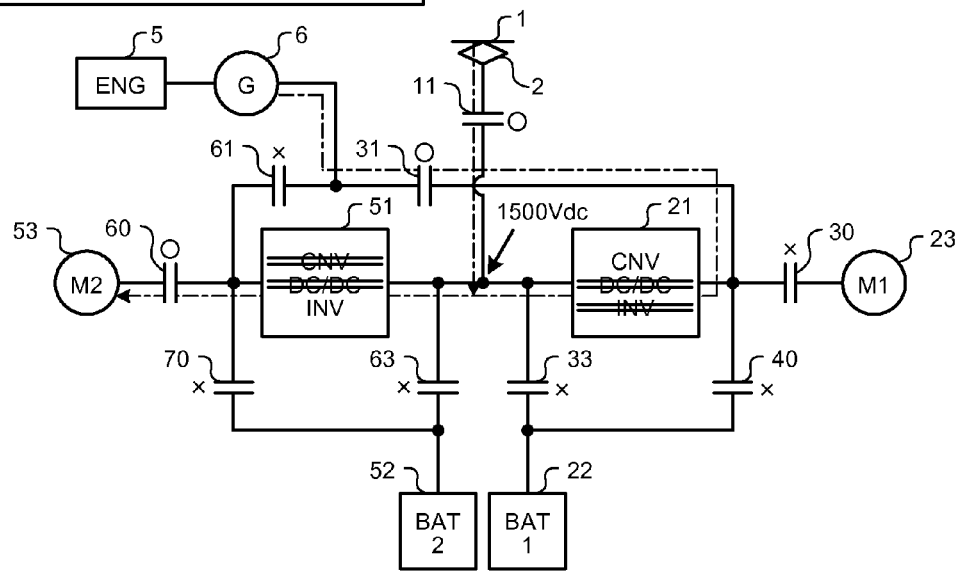
FIG. 30 is a diagram of an operation in which the second motor is driven using both of the electric power of the direct-current overhead wire and the power generated by the generator.

FIG. 30 is a diagram of an operation in which the second motor 53 is driven using both of the electric power of the direct-current overhead wire 1 and the power generated by the generator 6. In such control, it is assumed that, for example, the SOCs of the first power storage device 22 and the second power storage device 52 are low. As shown in the figure, when the second motor 53 is driven using the electric power of the direct-current overhead wire 1 and the power generated by the generator 6, the direct-current pantograph 2 is lifted, the first circuit breaker 11 is controlled so as to be turned on, the eighth contactor 61 is controlled so as to be turned off, the tenth contactor 31 is controlled so as to be turned on, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 operates as the AC/DC converter (CNV). The second power converter 51 receives both of the electric power of the first power converter 21 and the overhead wire power to operate as the DC/AC converter (INV) and drives the second motor 53. Note that, in the control, the first power converter 21 is controlled such that the voltage of the direct-current common section changes to the high voltage (near 1500 Vdc) adjusted to the overhead wire voltage.

(b-9: Power Running+Discharging)

Figure 31:
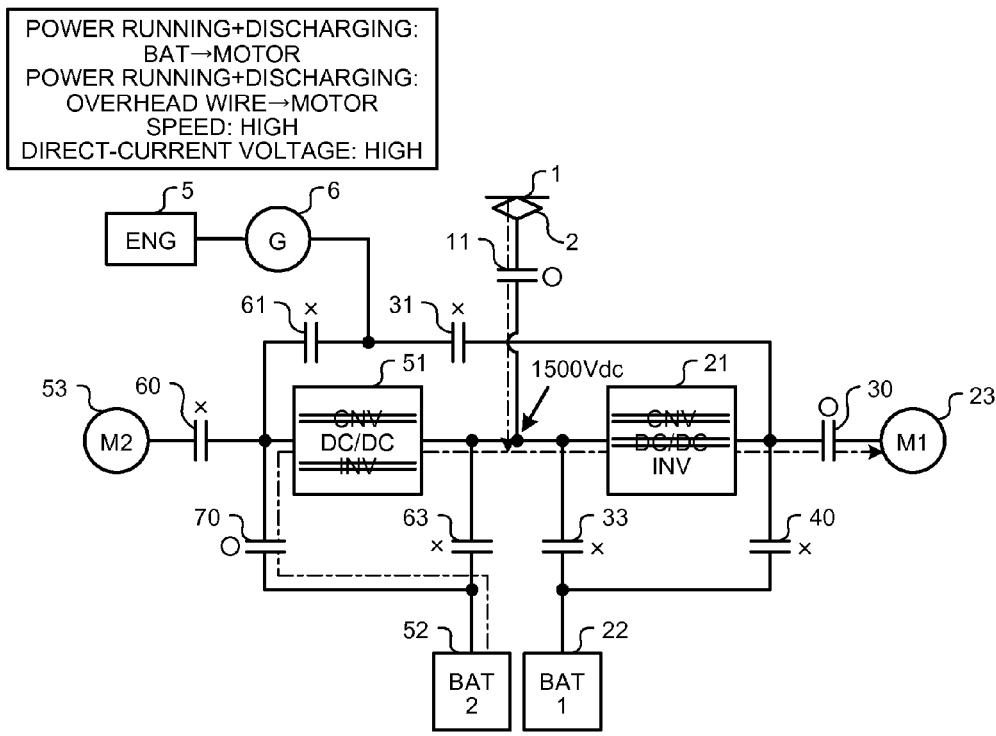
FIG. 31 is a diagram of an operation in which the first motor is driven using both of the electric power of the direct-current overhead wire and the stored power of the second power storage device.

FIG. 31 is a diagram of an operation in which the first motor 23 is driven using both of the electric power of the direct-current overhead wire 1 and the stored power of the second power storage device 52. As shown in the figure, when the first motor 23 is driven using both of the electric power of the direct-current overhead wire 1 and the stored power of the second power storage device 52, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned on, the fourth contactor 63 is controlled so as to be turned off, the third contactor 33 is controlled so as to be turned off, and the second contactor 40 is controlled so as to be turned off. Under the control, the second power converter 51 receives the stored power of the second power storage device 52 to operate as the DC/DC converter (DC/DC). The first power converter 21 receives the output power of the second power converter 51 and the overhead wire power to operate as the DC/AC converter (INV) and drives the first motor 23. Note that, in the control, the second power converter 51 is controlled such that the voltage of the direct-current common section changes to the high voltage (near 1500 Vdc) adjusted to the overhead wire voltage.

(b-10: Power Running+Discharging)

Figure 32:
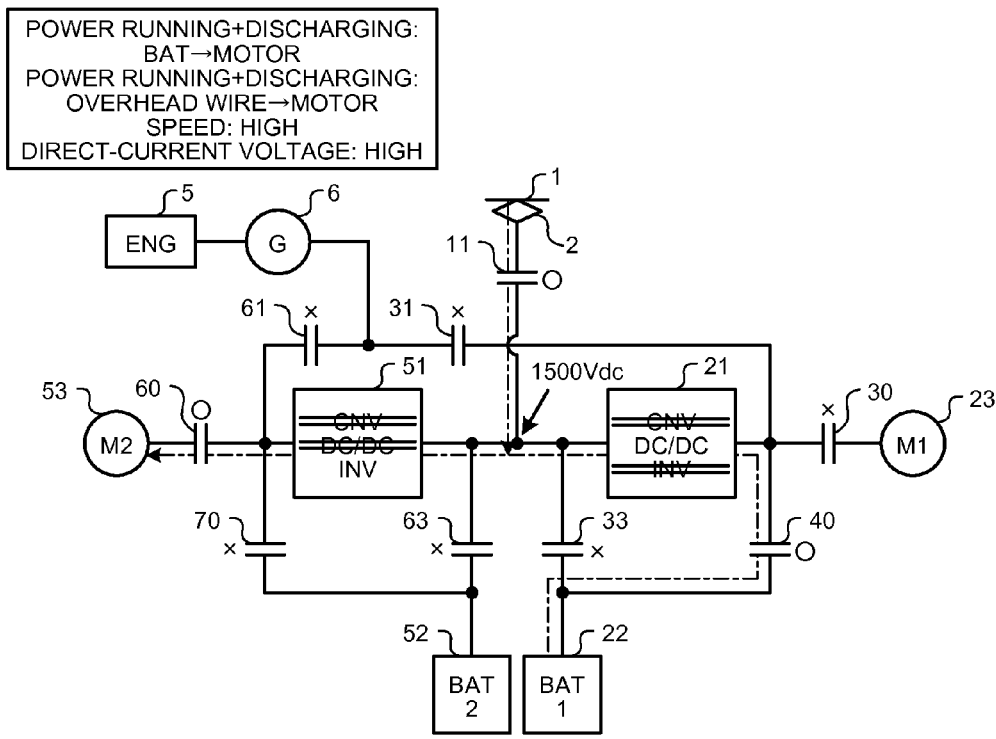
FIG. 32 is a diagram of an operation in which the second motor is driven using both of the electric power of the direct-current overhead wire and the stored power of the first power storage device.

FIG. 32 is a diagram of an operation in which the second motor 53 is driven using both of the electric power of the direct-current overhead wire 1 and the stored power of the first power storage device 22. As shown in the figure, when the second motor 53 is driven using both of the electric power of the direct-current overhead wire 1 and the stored power of the first power storage device 22, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, the first power converter 21 receives the stored power of the first power storage device 22 to operate as the DC/DC converter (DC/DC). The second power converter 51 receives the output power of the first power converter 21 and the overhead wire power to operate as the DC/AC converter (INV) and drives the second motor 53. Note that, in the control, the first power converter 21 is controlled such that the voltage of the direct-current common section changes to the high voltage (near 1500 Vdc) adjusted to the overhead wire voltage.

(b-11. Power Running+Charging)

Figure 33:
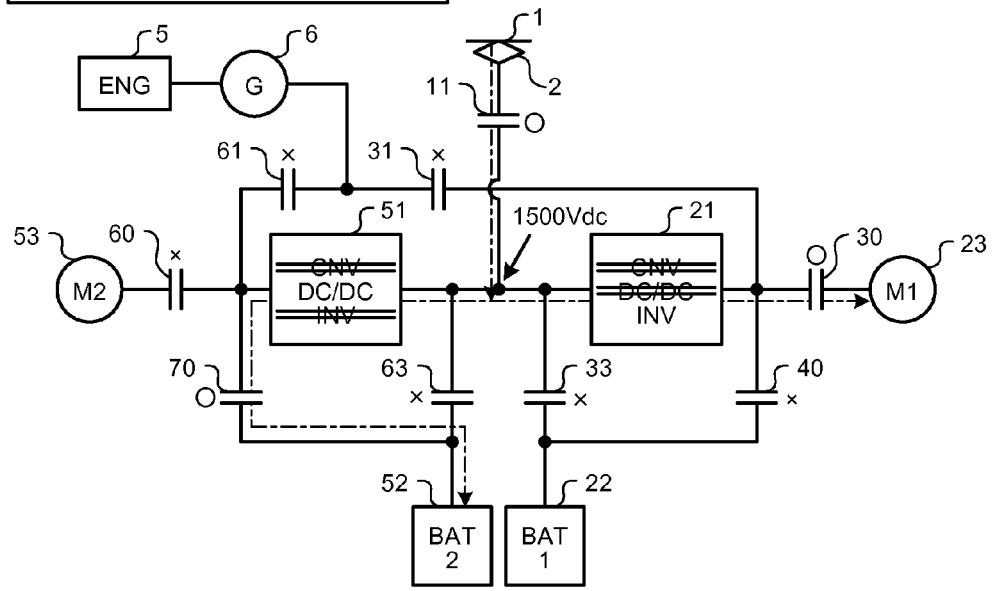
FIG. 33 is a diagram of an operation in which the electric power of the direct-current overhead wire is used as driving power for the first motor and charged power in the second power storage device.

FIG. 33 is a diagram of an operation in which the electric power of the direct-current overhead wire 1 is used as the driving power for the first motor 23 and the charged power in the second power storage device 52. As shown in the figure, when the overhead wire power is used as the driving power for the first motor 23 and the charged power in the second power storage device 52, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned on, the fourth contactor 63 is controlled so as to be turned off, the third contactor 33 is controlled so as to be turned off, and the second contactor 40 is controlled so as to be turned off. Under the control, the first power converter 21 receives the overhead wire power to operate as the DC/AC converter (INV) and drives the first motor 23. The second power converter 51 receives a part of the overhead wire power to operate as the DC/DC converter (DC/DC) and charges the second power storage device 52.

(b-12: Power Running+Charging)

Figure 34:
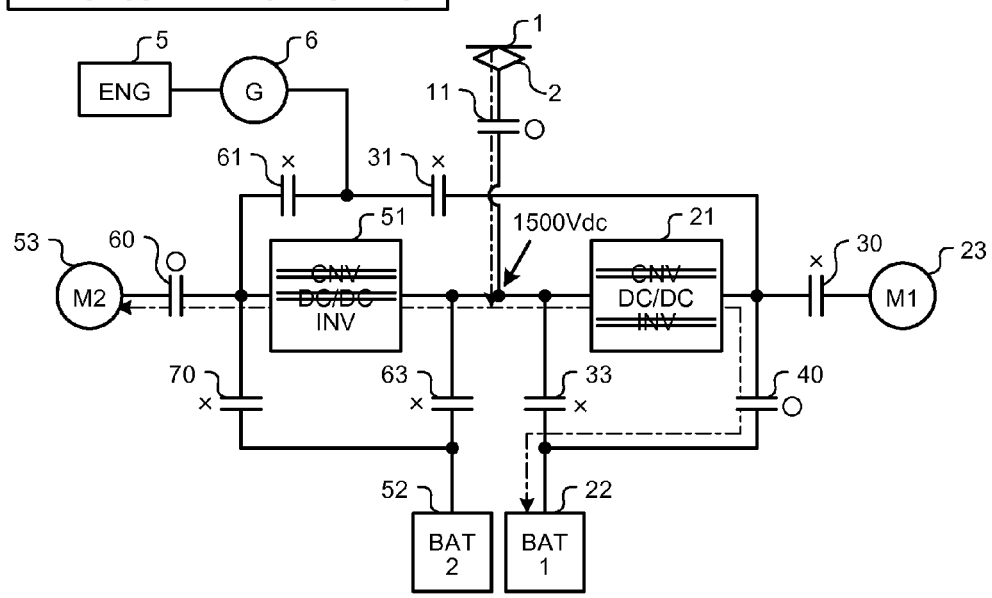
FIG. 34 is a diagram of an operation in which the electric power of the direct-current overhead wire is used as driving power for the second motor and charged power in the first power storage device.

FIG. 34 is a diagram of an operation in which the electric power of the direct-current overhead wire 1 is used as the driving power for the second motor 53 and the charged power in the first power storage device 22. As shown in the figure, when the overhead wire power is used as the driving power for the second motor 53 and the charged power in the first power storage device 22, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, the second power converter 51 receives the overhead wire power to operate as the DC/AC converter (INV) and drives the second motor 53. The first power converter 21 receives a part of the overhead wire power to operate as the DC/DC converter (DC/DC) and charges the first power storage device 22.

(b-13: Regeneration)

Figure 35:
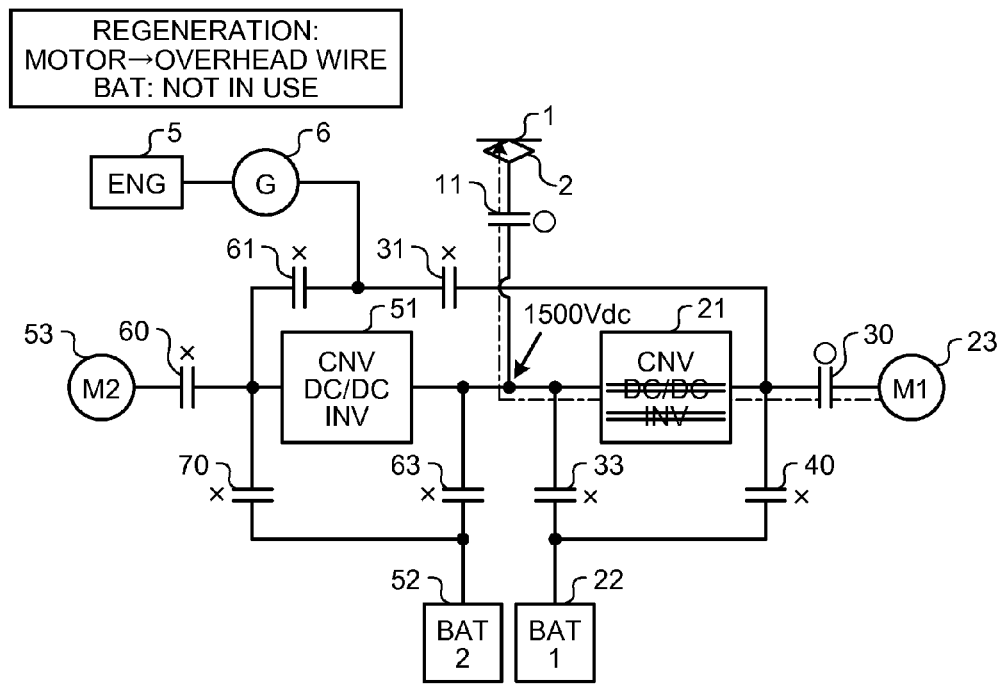
FIG. 35 is a diagram of an operation in which the regenerative power of the first motor is returned to the direct-current overhead wire.

FIG. 35 is a diagram of an operation in returning the regenerative power of the first motor 23 to the direct-current overhead wire 1. As shown in the figure, when the regenerative power of the first motor 23 is returned to the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 receives the regenerative power of the first motor 23 to operate as the AC/DC converter (CNV) and returns the regenerative power to the direct-current overhead wire 1. Note that, in the control, to return the regenerative power to the direct-current overhead wire 1, the voltage of the direct-current common section is controlled to a high voltage (near 1500 Vdc or a predetermined voltage equal to or higher than 1500 Vdc).

(b-14: Regeneration)

Figure 36:
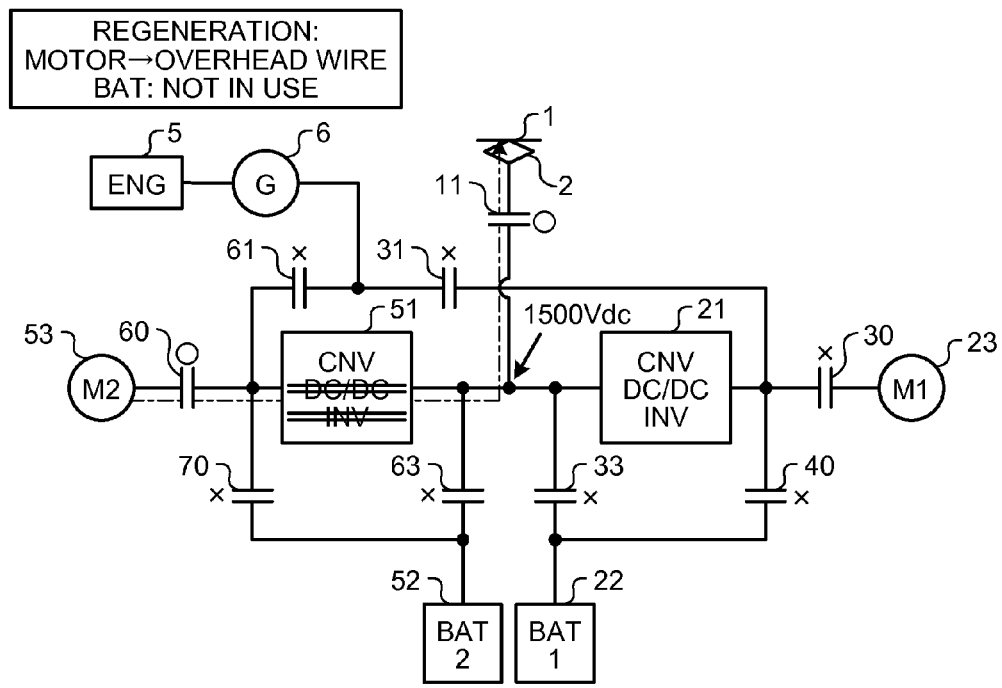
FIG. 36 is a diagram of an operation in which the regenerative power of the second motor is returned to the direct-current overhead wire.

FIG. 36 is a diagram of an operation in returning the regenerative power of the second motor 53 to the direct-current overhead wire 1. As shown in the figure, when the regenerative power of the second motor 53 is returned to the direct-current overhead wire 1, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned on, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 receives the regenerative power of the second motor 53 to operate as the AC/DC converter (CNV) and returns the regenerative power to the direct-current overhead wire 1. Note that, in the control, to return the regenerative power to the direct-current overhead wire 1, the voltage of the direct-current common section is controlled to the high voltage (near 1500 Vdc or the predetermined voltage equal to or higher than 1500 Vdc).

(b-15: Regeneration+Engine Brake)

Figure 37:
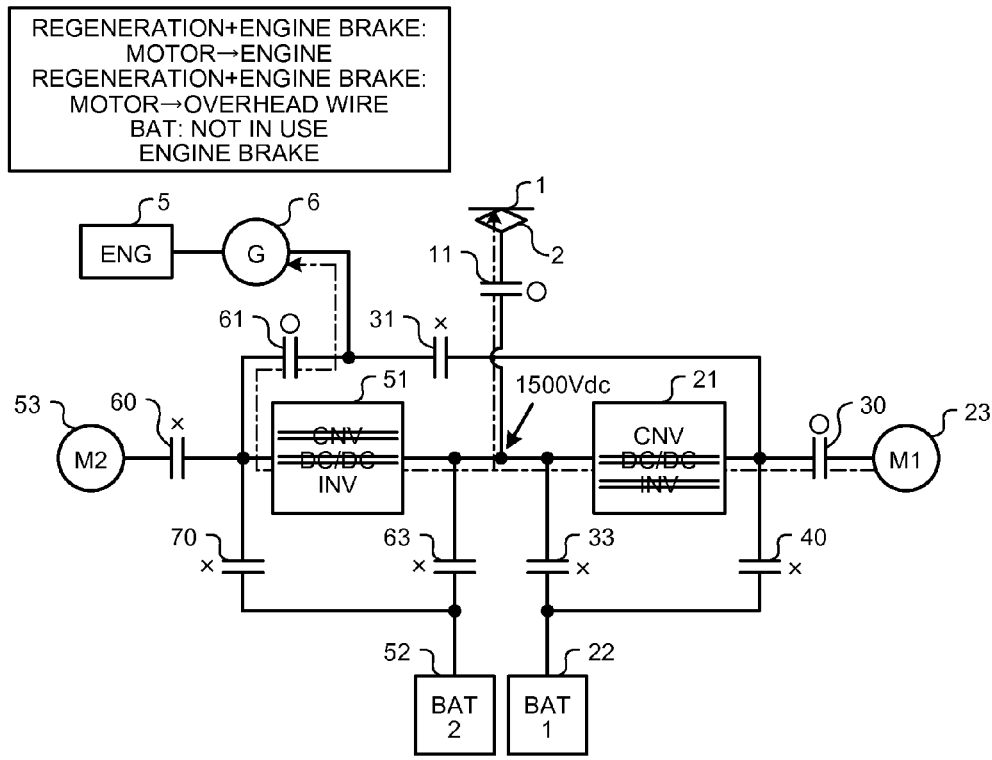
FIG. 37 is a diagram of an operation in which the regenerative power of the first motor is used as overhead wire power and the engine brake.

FIG. 37 is a diagram of an operation in which the regenerative power of the first motor 23 is used as the overhead wire power and the engine brake. As shown in the figure, when the regenerative power of the first motor 23 is used as the overhead wire power and the engine brake, the direct-current pantograph 2 is lifted, the first circuit breaker 11 is controlled so as to be turned on, the eighth contactor 61 is controlled so as to be turned on, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the first power converter 21 receives the regenerative power of the first motor 23 to operate as the AC/DC converter (CNV) and returns the regenerative power to the direct-current overhead wire 1. The second power converter 51 operates as the DC/AC converter (INV), drives the generator 6 using the excess power supplied from the first power converter 21, and applies the engine brake. Note that, in the control, the regenerative power is returned to the direct-current overhead wire 1. Therefore, the voltage of the direct-current common section is controlled to the high voltage (near 1500 Vdc or the predetermined voltage equal to or higher than 1500 Vdc).

(b-16: Regeneration+Engine Brake)

Figure 38:
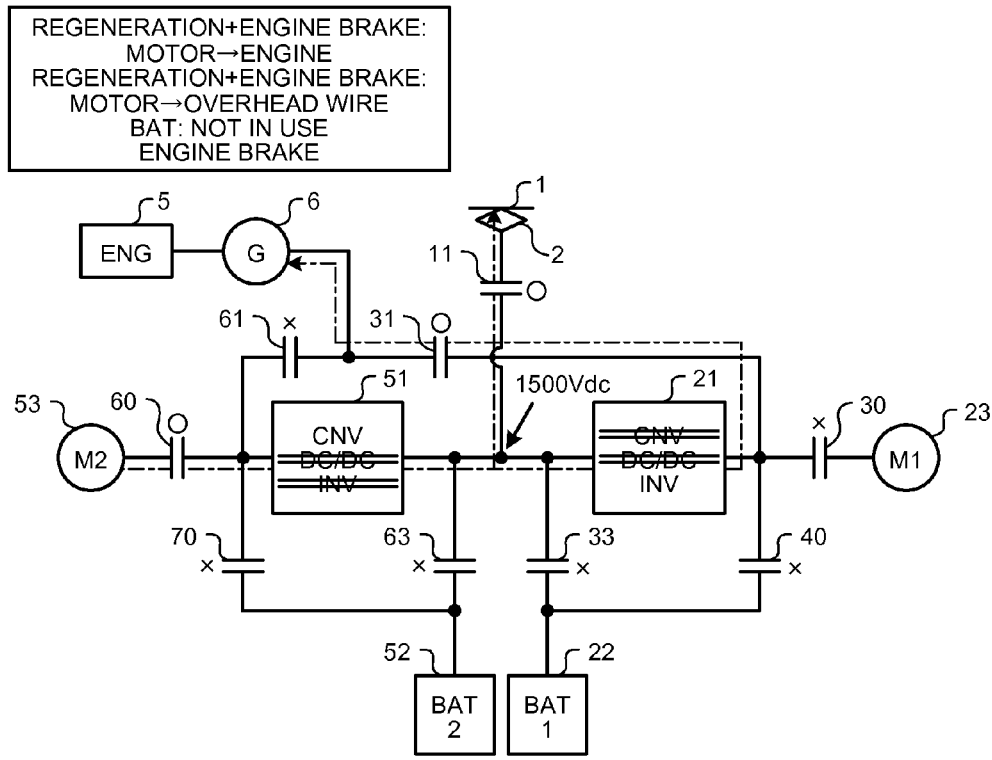
FIG. 38 is a diagram of an operation in which the regenerative power of the second motor is used as the overhead wire power and the engine brake.

FIG. 38 is a diagram of an operation in which the regenerative power of the second motor 53 is used as the overhead wire power and the engine brake. As shown in the figure, when the regenerative power of the second motor 53 is used as the overhead wire power and the engine brake, the direct-current pantograph 2 is lifted, the first circuit breaker 11 is controlled so as to be turned on, the eighth contactor 61 is controlled so as to be turned off, the tenth contactor 31 is controlled so as to be turned on, the fifth contactor 60 is controlled so as to be turned on, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned off. Under the control, the second power converter 51 receives the regenerative power of the second motor 53 to operate as the AC/DC converter (CNV) and returns the regenerative power to the direct-current overhead wire 1. The first power converter 21 operates as the DC/AC converter (INV), drives the generator 6 using the excess power supplied from the second power converter 51, and applies the engine brake. Note that, in the control, the regenerative power is returned to the direct-current overhead wire 1. Therefore, the voltage of the direct-current common section is controlled to the high voltage (near 1500 Vdc or the predetermined voltage equal to or higher than 1500 Vdc).

(b-17: Regeneration+Charging)

Figure 39:
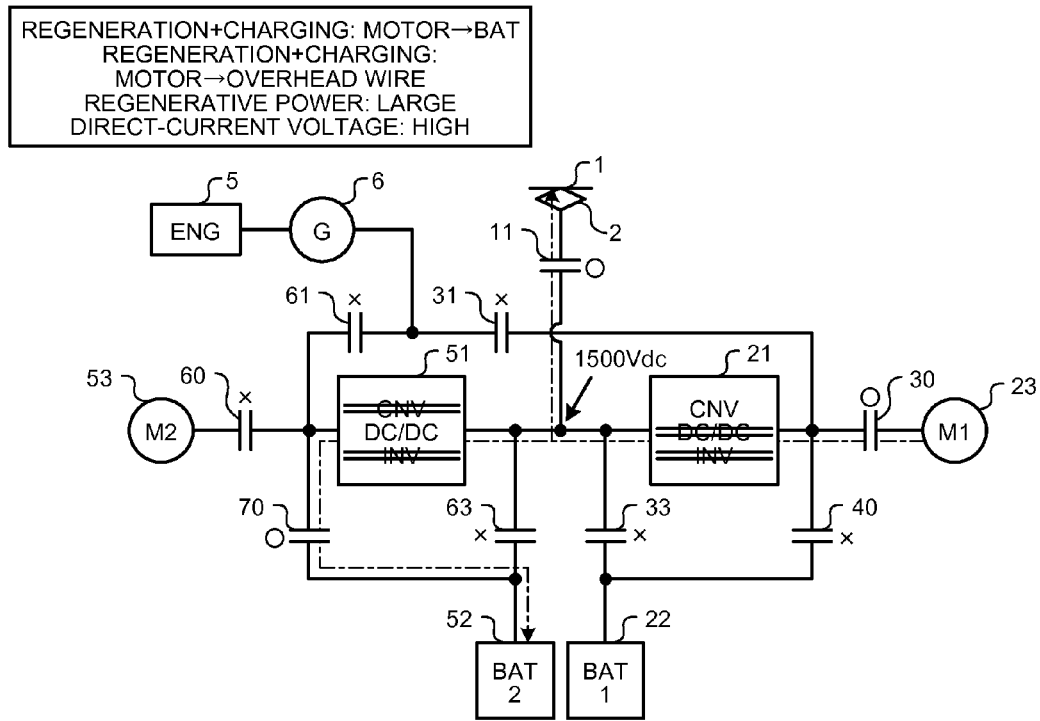
FIG. 39 is a diagram of an operation in which the regenerative power of the first motor is used as the overhead wire power and the charged power.

FIG. 39 is a diagram of an operation in which the regenerative power of the first motor 23 is used as the overhead wire power and the charged power. As shown in the figure, when the regenerative power of the first motor 23 is used as the overhead wire power and the charged power, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned on, the fourth contactor 63 is controlled so as to be turned on, the third contactor 33 is controlled so as to be turned off, and the second contactor 40 is controlled so as to be turned off. Under the control, the first power converter 21 receives the regenerative power of the first motor 23 to operate as the AC/DC converter (CNV) and returns the regenerative power to the direct-current overhead wire 1. The second power converter 51 receives a part of the regenerative power to operate as the DC/DC converter (DC/DC) and charges the second power storage device 52. Note that, in the control, the regenerative power is returned to the direct-current overhead wire 1. Therefore, the voltage of the direct-current common section is controlled to the high voltage (near 1500 Vdc or the predetermined voltage equal to or higher than 1500 Vdc).

(b-18: Regeneration+Charging)

Figure 40:
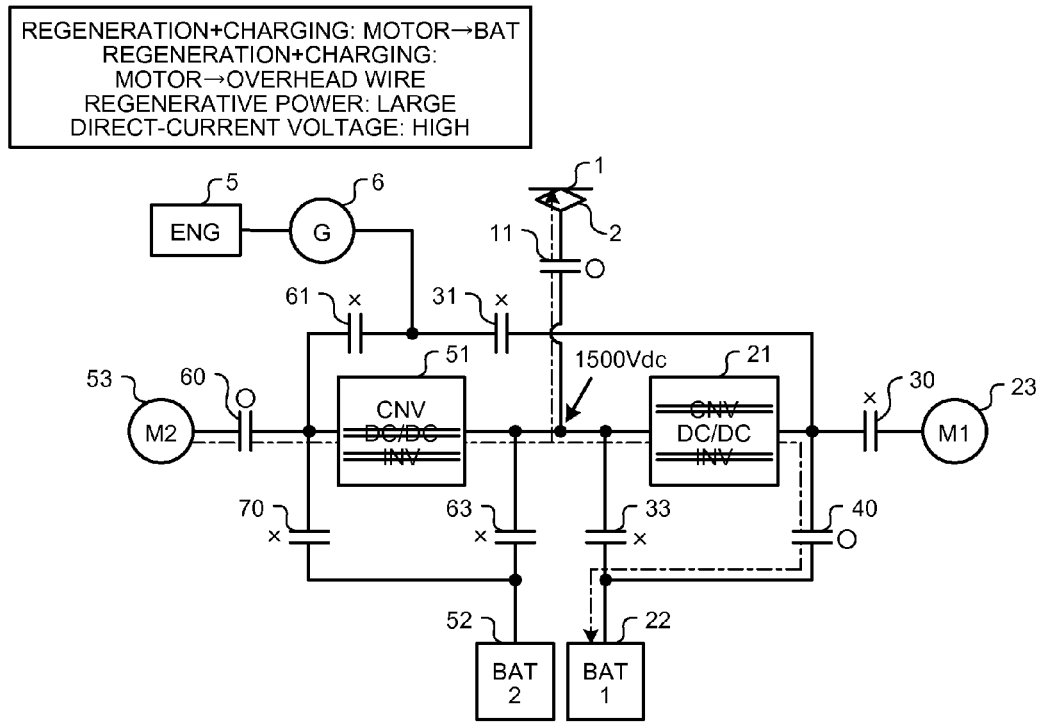
FIG. 40 is a diagram of an operation in which the regenerative power of the second motor is used as the overhead wire power and the charged power.

FIG. 40 is a diagram of an operation in which the regenerative power of the second motor 53 is used as the overhead wire power and the charged power. As shown in the figure, when the regenerative power of the second motor 53 is used as the overhead wire power and the charged power, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned on, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, the second power converter 51 receives the regenerative power of the first motor 23 to operate as the AC/DC converter (CNV) and returns the regenerative power to the direct-current overhead wire 1. The first power converter 21 receives a part of the regenerative power to operate as the DC/DC converter (DC/DC) and charges the first power storage device 22. Note that, in the control, the regenerative power is returned to the direct-current overhead wire 1. Therefore, the voltage of the direct-current common section is controlled to the high voltage (near 1500 Vdc or the predetermined voltage equal to or higher than 1500 Vdc).

(b-19: Charging/Discharging)

Figure 41:
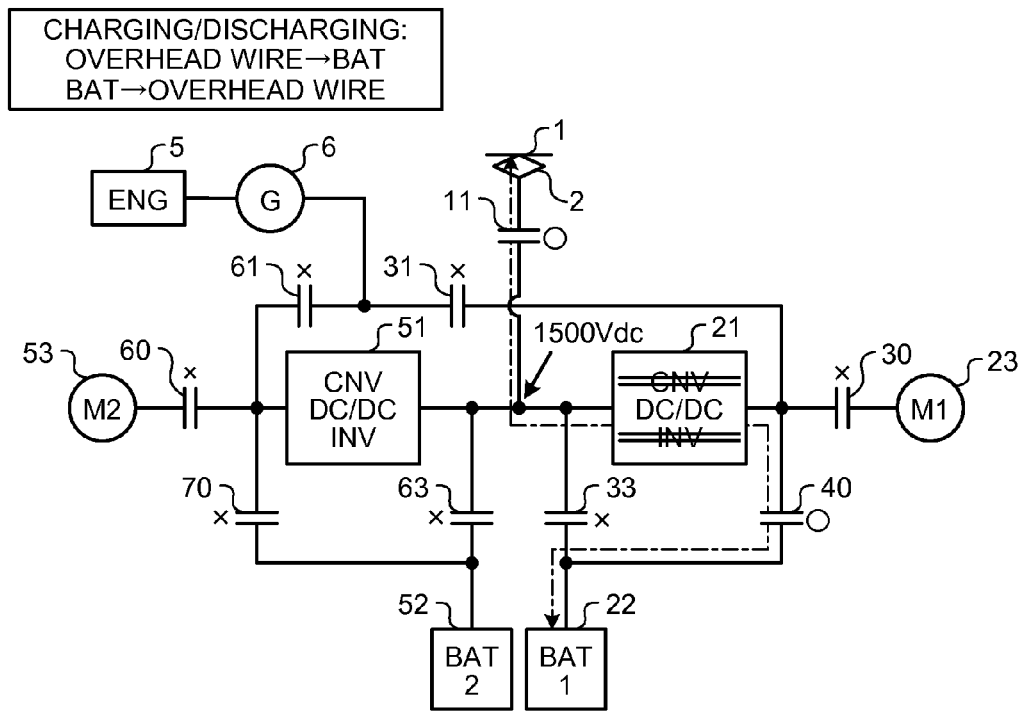
FIG. 41 is a diagram of an operation in which charging or discharging is performed between the direct-current overhead wire and the first power storage device.

FIG. 41 is a diagram of an operation in which charging or discharging is performed between the direct-current overhead wire 1 and the first power storage device 22. As shown in the figure, when charging or discharging is performed between the direct-current overhead wire 1 and the first power storage device 22, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned off, the sixth contactor 70 is controlled so as to be turned off, the fourth contactor 63 is controlled so as to be turned off, the third contactor 33 is controlled so as to be turned off, and the second contactor 40 is controlled so as to be turned on. Under the control, when charging in the first power storage device 22 is performed, the first power converter 21 operates as the DC/DC converter (DC/DC) and steps down the overhead wire voltage (near 1500 Vdc) to a predetermined low voltage to charge the first power storage device 22. On the other hand, when discharging is performed from the first power storage device 22, the second power converter 51 performs the discharging such that the charged voltage (near 600 Vdc) is stepped up to the overhead wire voltage (near 1500 Vdc).

(b-20: Charging/Discharging)

Figure 42:
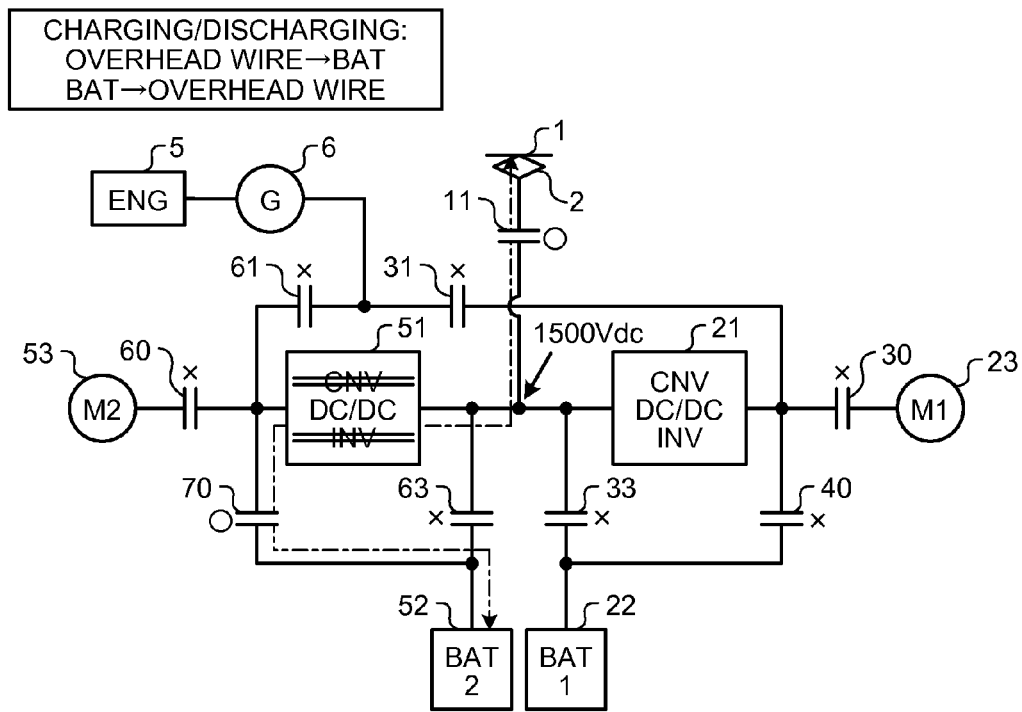
FIG. 42 is a diagram of an operation in which charging and discharging is performed between the direct-current overhead wire and the second power storage device.

FIG. 42 is a diagram of an operation in which charging or discharging is performed between the direct-current overhead wire 1 and the second power storage device 52. As shown in the figure, when charging or discharging is performed between the direct-current overhead wire 1 and the second power storage device 52, the direct-current pantograph 2 is lifted, the first circuit breaker 11 is controlled so as to be turned on, the eighth contactor 61 is controlled so as to be turned off, the tenth contactor 31 is controlled so as to be turned off, the fifth contactor 60 is controlled so as to be turned off, the first contactor 30 is controlled so as to be turned off, the sixth contactor 70 is controlled so as to be turned on, the fourth contactor 63 is controlled so as to be turned off, the third contactor 33 is controlled so as to be turned off, and the second contactor 40 is controlled so as to be turned off. Under the control, when charging in the second power storage device 52 is performed, the second power converter 51 operates as the DC/DC converter (DC/DC) and steps down the overhead wire voltage (near 1500 Vdc) to the predetermined low voltage to charge the second power storage device 52. On the other hand, when discharging is performed from the second power storage device 52, the first power converter 21 performs the discharging such that the charged voltage (near 600 Vdc) is stepped up to the overhead wire voltage (near 1500 Vdc).

FIG. 43 is a diagram of a list in a table format of the operations shown in FIG. 23 to FIG. 42. Not only operation states or control states of the sections shown in the figures but also control states of the sections shown in FIG. 1 are shown. Meanings of signs are as explained with reference to FIG. 22. Detailed explanation of the meaning of the signs is omitted.

As explained above, the propulsion control apparatus in the embodiment includes the first power converter 21 that is configured to be connectable to the direct-current common section 90 and, when the direct-current power from the direct-current common section 90 is input, operates as the DC/AC converter, converts the direct-current power into desired alternating-current power, and supplies the alternating-current power to the first motor 23 or the alternating-current power supply source (the engine 5 and the generator 6) that generates a driving force for the vehicle, when the regenerative power from the first motor 23 or the alternating-current power from the alternating-current power supply source is input from the first input and output end side, operates as the AC/DC converter, converts the regenerative power or the alternating-current power into direct-current power, and outputs the direct-current power to the direct-current common section 90 via the second input and output end different from the first input and output end, when the direct-current power is input from the first input and output end side, operates as the DC/DC converter and outputs desired direct-current power to the second input and output end side, and, when the direct-current power is input from the second input and output end side, operates as the DC/DC converter and outputs desired direct-current power to the first input and output end side, the second power converter 51 that is configured to be connectable to the direct-current common section 90 and, when the direct-current power is input from the direct-current common section 90, operates as the DC/AC converter, converts the direct-current power into desired alternating-current power, and supplies the alternating-current power to the second motor 53 different from the first motor 23 or to the alternating-current power supply source, when the regenerative power from the second motor 53 or the alternating-current power from the alternating-current power supply source is input from the first input and output end side, operates as the AC/DC converter, converts the regenerative power or the alternating-current power into direct-current power, and outputs the direct-current power to the direct-current common section 90 via the second input and output end different from the first input and output end, when the direct-current power is input from the first input and output end side, operates as the DC/DC converter and outputs desired direct-current power to the second input and output end side, and, when the direct-current power is input from the second input and output end side, operates as the DC/DC converter and outputs desired direct-current power to the first input and output end side, the power storage device (the first power storage device 22 and the second power storage device 52) functioning as the direct-current power supply source that is configured to be connectable to the direct-current common section 90 and to the first input and output end side of the first power converter 21 and is charged using the direct-current power supplied from the direct-current common section 90 or to the first input and output end side or discharges the direct-current power to the direct-current common section 90 or the first input and output end side, and the control device 100 that controls the operations of the first power converter 21, the second power converter 51, and the power storage device. With this configuration, it is unnecessary to provide a third power converter. It is possible to realize a configuration that does not cause an increase of power converters even when the conventional hybrid vehicle is enabled to be used even with the overhead wire power. As a result, it is possible to realize a reduction in costs, a reduction in the size, and a reduction in the weight of the apparatus.

Note that, in this embodiment, the configuration example of the propulsion control apparatus including the engine 5 and the generator 6 as the alternating-current power supply source is explained. However, the same effects can be obtained if the propulsion control apparatus is configured to receive, via an alternating-current pantograph, alternating-current power from a single-phase alternating-current overhead wire instead of the engine 5 and the generator 6 and supply (apply) the received alternating-current power to the first power converter 21 or the second power converter 51 via a transformer.

Note that the propulsion control apparatus of the electric motor vehicle explained in the embodiment indicates an example of contents of the present invention. It goes without saying that the propulsion control apparatus of the electric motor vehicle can be combined with still other publicly-known technologies or can be configured to be changed, for example, partially omitted without departing from the spirit of the present invention.

INDUSTRIAL APPLICABILITY

As explained above, the present invention is applicable to a propulsion control apparatus of an electric motor vehicle and, in particular, useful as an invention that does not cause an increase of power converters even when the conventional hybrid vehicle is enabled to be used even with overhead wire power.

REFERENCE SIGNS LIST

1 Direct-current overhead wire
2 Direct-current pantograph

3 Auxiliary power supply device (SIV)
4 Auxiliary machine
5 Engine
6 Generator
7 First speed detector
8 Wheel
9 Rail
10 Ninth contactor
11 First circuit breaker
12 Overhead-wire-current detector
13 Overhead-wire-voltage detector
21 First power converter
22 First power storage device
23 First motor
24 Third circuit breaker
25 First line breaker
26 Second line breaker
27 First charging resistor
28 First filter reactor
29 First filter capacitor
30 First contactor
31 Tenth contactor
32 First reactor
33 Third contactor
34 Second speed detector
35 First direct current detector
36 First filter-capacitor-voltage detector
37 First power-converter-output-current detector
38 First power-storage-device-current detector
39 First power-storage-device-voltage detector
40 Second contactor
51 Second power converter
52 Second power storage device
53 Second motor
54 Third speed detector
55 Third line breaker
56 Fourth line breaker
57 Second charging resistor
58 Second filter reactor
59 Second filter capacitor
60 Fifth contactor
61 Eighth contactor
63 Fourth contactor
64 Second circuit breaker
65 Second direct current detector
66 Second filter-capacitor-voltage detector
67 Second power-converter-output-current detector
68 Second power-storage-device-current detector
69 Second power-storage-device-voltage detector
70 Sixth contactor
72 Second reactor
90 Current common section
100 Control device

The invention claimed is:

1. A propulsion control apparatus of an electric motor vehicle comprising:
a first power converter that is configured to be connectable to a direct-current common section and, when direct-current power from the direct-current common section is input, operates as a DC/AC converter, converts the direct-current power into desired alternating-current power, and supplies the alternating-current power to a first motor or an alternating-current power supply source that generates a driving force for the vehicle, when regenerative power from the first motor or alternating-current power from the alternating-current power supply source is input from a first input and output end side, operates as an AC/DC converter, converts the regenerative power or the alternating-current power into direct-current power, and outputs the direct-current power to the direct-current common section via a second input and output end different from the first input and output end, when direct-current power is input from the first input and output end side, operates as a DC/DC converter and outputs desired direct-current power to the second input and output end side, and, when direct-current power is input from the second input and output end side, operates as a DC/DC converter and outputs desired direct-current power to the first input and output end side;
a second power converter that is configured to be connectable to the direct-current common section and, when direct-current power is input from the direct-current common section, operates as a DC/AC converter, converts the direct-current power into desired alternating-current power, and supplies the alternating-current power to a second motor different from the first motor or the alternating-current power supply source, when regenerative power from the second motor or alternating-current power from the alternating-current power supply source is input from a first input and output end side, operates as an AC/DC converter, converts the regenerative power or the alternating-current power into direct-current power, and outputs the direct-current power to the direct-current common section via a second input and output end different from the first input and output end, when direct-current power is input from the first input and output end side, operates as a DC/DC converter and outputs desired direct-current power to the second input and output end side, and, when direct-current power is input from the second input and output end side, operates as a DC/DC converter and outputs desired direct-current power to the first input and output end side;
a power storage device functioning as a direct-current power supply source that is configured to be connectable to the direct-current common section and the first input and output end side of the first power converter and is charged using the direct-current power supplied from the direct-current common section or the first input and output end side or discharges the direct-current power to the direct-current common section or the first input and output end side; and
a control device that controls operations of the first power converter, the second power converter, and the power storage device.

2. The propulsion control apparatus of the electric motor vehicle according to claim 1, wherein the control device converts, when causing the second power converter to operate as an AC/DC converter, power generated by the alternating-current power supply source into direct-current power and supplies the direct-current power to the first power converter, causes the first power converter to operate as a DC/AC converter, and drives the first motor using the direct-current powers from the second power converter and the power storage device, and converts, when causing the first power converter to operate as the AC/DC converter, the power generated by the alternating-current power supply source into direct-current power and supplies the direct-current power to the second power converter, causes the second power converter to operate as the DC/AC converter, and drives the second motor using the direct-current powers from the first power converter and the power storage device.

3. The propulsion control apparatus of the electric motor vehicle according to claim 2, wherein the control device controls, when causing the second power converter to operate as an AC/DC converter, an output voltage of the second power converter such that the voltage of the direct-current common section is a low voltage adjusted to an output voltage of the power storage device and controls, when causing the first power converter to operate as an AC/DC converter, an output voltage of the first power converter such that the voltage of the direct-current common section is the low voltage adjusted to the output voltage of the power storage device.

4. The propulsion control apparatus of the electric motor vehicle according to claim 1, wherein the control device converts, when causing the first power converter to operate as a DC/DC converter, direct-current power of the power storage device into desired direct-current power and supplies the direct-current power to the second power converter, causes the second power converter to operate as a DC/AC converter, and drives the second motor using the direct-current power from the second power converter, and converts, when causing the second power converter to operate as a DC/DC converter, the direct-current power of the power storage device into desired direct-current power and supplies the direct-current power to the first power converter, causes the first power converter to operate as a DC/AC converter, and drives the first motor using the direct-current power from the second power converter.

5. The propulsion control apparatus of the electric motor vehicle according to claim 4, wherein the control device controls, when causing the first power converter to operate as a DC/DC converter, an output voltage of the first power converter such that the voltage of the direct-current common section is a high voltage adjusted to an output voltage of another direct-current power supply source and controls, when causing the second power converter to operate as a DC/DC converter, an output voltage of the second power converter such that the voltage of the direct-current common section is a high voltage adjusted to an output voltage of the another direct-current power supply source.

6. The propulsion control apparatus of the electric motor vehicle according to claim 5, wherein the another direct-current power supply source is a direct-current overhead wire.

7. The propulsion control apparatus of the electric motor vehicle according to claim 6, wherein the control device drives the first motor or the second motor further using electric power of the direct-current overhead wire.

8. The propulsion control apparatus of the electric motor vehicle according to claim 7, wherein
an engine and a generator driven by the engine are provided as the alternating-current power supply source, and
when the electric power of the direct-current overhead wire is not supplied to the direct-current common section, the control device supplies electric power of the power storage device to the direct-current common section, causes the first power converter or the second power converter to operate as a DC/AC converter to convert direct-current power from the direct-current common section into alternating-current power, and drives the generator as a motor to start the engine.

9. The propulsion control apparatus of the electric motor vehicle according to claim 1, wherein
an engine and a generator driven by the engine are provided as the alternating-current power supply source, and
the control device receives, when causing the first power converter to operate as an AC/DC converter, regenerative power of the first motor to charge the power storage device, causes the second power converter to operate as a DC/AC converter, and drives the generator using excess power supplied from the first power converter to apply an engine brake and receives, when causing the second power converter to operate as an AC/DC converter, regenerative power of the second motor to charge the power storage device, causes the first power converter to operate as a DC/AC converter, and drives the generator using excess power supplied from the second power converter to apply the engine brake.

10. The propulsion control apparatus of the electric motor vehicle according to claim 9, wherein the control device controls, when causing the first power converter to operate as an AC/DC converter, an output voltage of the first power converter such that a voltage of the direct-current common section is a low voltage adjusted to an output voltage of the power storage device and controls, when causing the second power converter to operate as an AC/DC converter, an output voltage of the second power converter such that the voltage of the direct-current common section is the low voltage adjusted to the output voltage of the power storage device.

11. The propulsion control apparatus of the electric motor vehicle according to claim 1, wherein the control device converts, when causing the first power converter to operate as an AC/DC converter, regenerative power of the first motor into direct-current power, causes the second power converter to operate as the DC/DC converter, and supplies, from the first input and output end side of the second power converter, converted power from the first power converter to charge the power storage device and converts, when causing the second power converter to operate as an AC/DC converter, regenerative power of the second motor into direct-current power, causes the first power converter to operate as a DC/DC converter, and supplies, from the first input and output end side of the first power converter, converted power from the second power converter to charge the power storage device.

12. The propulsion control apparatus of the electric motor vehicle according to claim 11, wherein the control device controls, when causing the first power converter to operate as an AC/DC converter, an output voltage of the first power converter such that a voltage of the direct-current common section is a high voltage adjusted to an output voltage of another direct-current power supply source and controls, when causing the second power converter to operate as an AC/DC converter, an output voltage of the second power converter such that the voltage of the direct-current common section is the high voltage adjusted to the output voltage of the another direct-current power supply source.

13. The propulsion control apparatus of the electric motor vehicle according to claim 12, wherein the another direct-current power supply source is a direct-current overhead wire.

14. The propulsion control apparatus of the electric motor vehicle according to claim 13, wherein the control device charges the power storage device further using electric power of the direct-current overhead wire.

15. The propulsion control apparatus of the electric motor vehicle according to claim 1, wherein,
when an alternating-current overhead wire functioning as the alternating-current power supply source is configured to be connected to the first input and output end side of the first power converter or the second power converter via a transformer,
the control device converts, when causing the first power converter to operate as an AC/DC converter, regenerative power of the first motor into direct-current power to charge the power storage device, causes the second power converter to operate as a DC/AC converter, converts excess power of regenerative power supplied from the first power converter into alternating-current power, and supplies the alternating-current power to the alternating-current overhead wire and converts, when causing the second power converter to operate as an AC/DC converter, regenerative power of the second motor into direct-current power to charge the power storage device, causes the first power converter to operate as a DC/AC converter, converts excess power of regenerative power supplied from the second power converter into alternating-current power, and supplies the alternating-current power to the alternating-current overhead wire.

16. The propulsion control apparatus of the electric motor vehicle according to claim 15, wherein the control device causes, when performing charging in the power storage device, the first power converter or the second power converter to operate as an AC/DC converter and steps down the voltage of the alternating-current overhead wire to a predetermined low voltage to charge the power storage device and causes, when performing discharging from the power storage device, the first power converter or the second power converter to operate as a DC/AC converter, steps up the output voltage of the power storage device to a predetermined alternating-current voltage, and discharges the alternating-current voltage to the alternating-current overhead wire.

17. The propulsion control apparatus of the electric motor vehicle according to claim 15, wherein the control device causes, when performing power interchange from the direct-current overhead wire to the alternating-current overhead wire, the first power converter or the second power converter to operate as a DC/AC converter and causes, when performing the power interchange from the alternating-current overhead wire to the direct-current overhead wire, the first power converter or the second power converter to operate as an AC/DC converter.

18. A control method for a propulsion control apparatus of an electric motor vehicle, the propulsion control apparatus including:
 a first power converter that is configured to be connectable to a direct-current common section and, when direct-current power from the direct-current common section is input, operates as a DC/AC converter, converts the direct-current power into desired alternating-current power, and supplies the alternating-current power to a first motor or an alternating-current power supply source that generates a driving force for the vehicle, when regenerative power from the first motor or alternating-current power from the alternating-current power supply source is input from a first input and output end side, operates as an AC/DC converter, converts the regenerative power or the alternating-current power into direct-current power, and outputs the direct-current power to the direct-current common section via a second input and output end different from the first input and output end, when direct-current power is input from the first input and output end side, operates as a DC/DC converter and outputs desired direct-current power to the second input and output end side, and, when direct-current power is input from the second input and output end side, operates as a DC/DC converter and outputs desired direct-current power to the first input and output end side;
 a second power converter that is configured to be connectable to the direct-current common section and, when direct-current power is input from the direct-current common section, operates as the DC/AC converter, converts the direct-current power into desired alternating-current power, and supplies the alternating-current power to a second motor different from the first motor or the alternating-current power supply source, when regenerative power from the second motor or alternating-current power from the alternating-current power supply source is input from a first input and output end side, operates as the AC/DC converter, converts the regenerative power or the alternating-current power into direct-current power, and outputs the direct-current power to the direct-current common section via a second input and output end different from the first input and output end, when direct-current power is input from the first input and output end side, operates as a DC/DC converter and outputs desired direct-current power to the second input and output end side, and, when direct-current power is input from the second input and output end side, operates as a DC/DC converter and outputs desired direct-current power to the first input and output end side;
 a power storage device functioning as a direct-current power supply source that is configured to be connectable to the direct-current common section and the first input and output end side of the first power converter and is charged using the direct-current power supplied from the direct-current common section or the first input and output end side or discharges the direct-current power to the direct-current common section or the first input and output end side; and
 a control device that controls operations of the first power converter, the second power converter, and the power storage device,
wherein the control method includes setting of a voltage of the direct-current common section to different voltages during departure and during power running of the vehicle.

* * * * *